United States Patent
Tsuboya et al.

[11] Patent Number: 6,130,888
[45] Date of Patent: Oct. 10, 2000

[54] ATM TRANSMISSION METHOD HAVING SILENCE COMPRESSION CONTROLLING FUNCTION AND SYSTEM TRANSMITTER AND RECEIVER USING THE METHOD

[75] Inventors: Hisakazu Tsuboya, Kawasaki; Hiroshi Nakamura; Masafumi Onuki, both of Tokyo; Akihisa Nakajima, Higashimurayama, all of Japan

[73] Assignee: NTT Mobile Communications Network, Inc., Tokyo, Japan

[21] Appl. No.: 08/817,996

[22] PCT Filed: Aug. 30, 1996

[86] PCT No.: PCT/JP96/02438

§ 371 Date: Nov. 5, 1997

§ 102(e) Date: Nov. 5, 1997

[87] PCT Pub. No.: WO97/08871

PCT Pub. Date: Mar. 6, 1997

[30] Foreign Application Priority Data

Aug. 31, 1995 [JP] Japan .................................. 7-223861

[51] Int. Cl.[7] ....................................................... H04L 12/56
[52] U.S. Cl. ............................ 370/395; 370/440; 370/468
[58] Field of Search ...................................... 370/389, 392, 370/395, 465, 468, 470, 474, 522, 527, 529, 396, 397, 398, 399, 400, 410

[56] References Cited

U.S. PATENT DOCUMENTS

| | | | |
|---|---|---|---|
| 5,058,111 | 10/1991 | Kihara et al. ........................... | 370/420 |
| 5,414,796 | 5/1995 | Jacobs et al. ........................... | 704/221 |
| 5,757,801 | 5/1998 | Arimilli ................................... | 370/444 |
| 5,897,613 | 4/1999 | Chan ....................................... | 704/210 |

FOREIGN PATENT DOCUMENTS

| | | |
|---|---|---|
| 4-157843 | 5/1992 | Japan . |
| 4-249446 | 9/1992 | Japan . |
| 5-244201 | 9/1993 | Japan . |
| 5-292121 | 11/1993 | Japan . |
| 6-97960 | 4/1994 | Japan . |

*Primary Examiner*—Chi H. Pham
*Assistant Examiner*—Kwang B. Yao
*Attorney, Agent, or Firm*—Brown Raysman Millstein Felder & Steiner LLP

[57] ABSTRACT

An ATM transmission system which transmits voice data in an asynchronous transfer mode (ATM). It implements compression of a mute section over a channel by detecting the mute section of a call and by physically suppressing its transmission over the channel as an ATM cell. A transmitting side detects the mute section, generates vocal/mute information, and generates a mute start cell and a mute end cell. A receiving side generates a mute section at a fixed interval when receiving the mute start cell, and returns to a normal receiving mode of a speech spurt cell immediately when receiving the mute end cell. The suppression of the mute section makes it possible to reduce the occupied bandwidth, and to increase the channel efficiency.

26 Claims, 31 Drawing Sheets

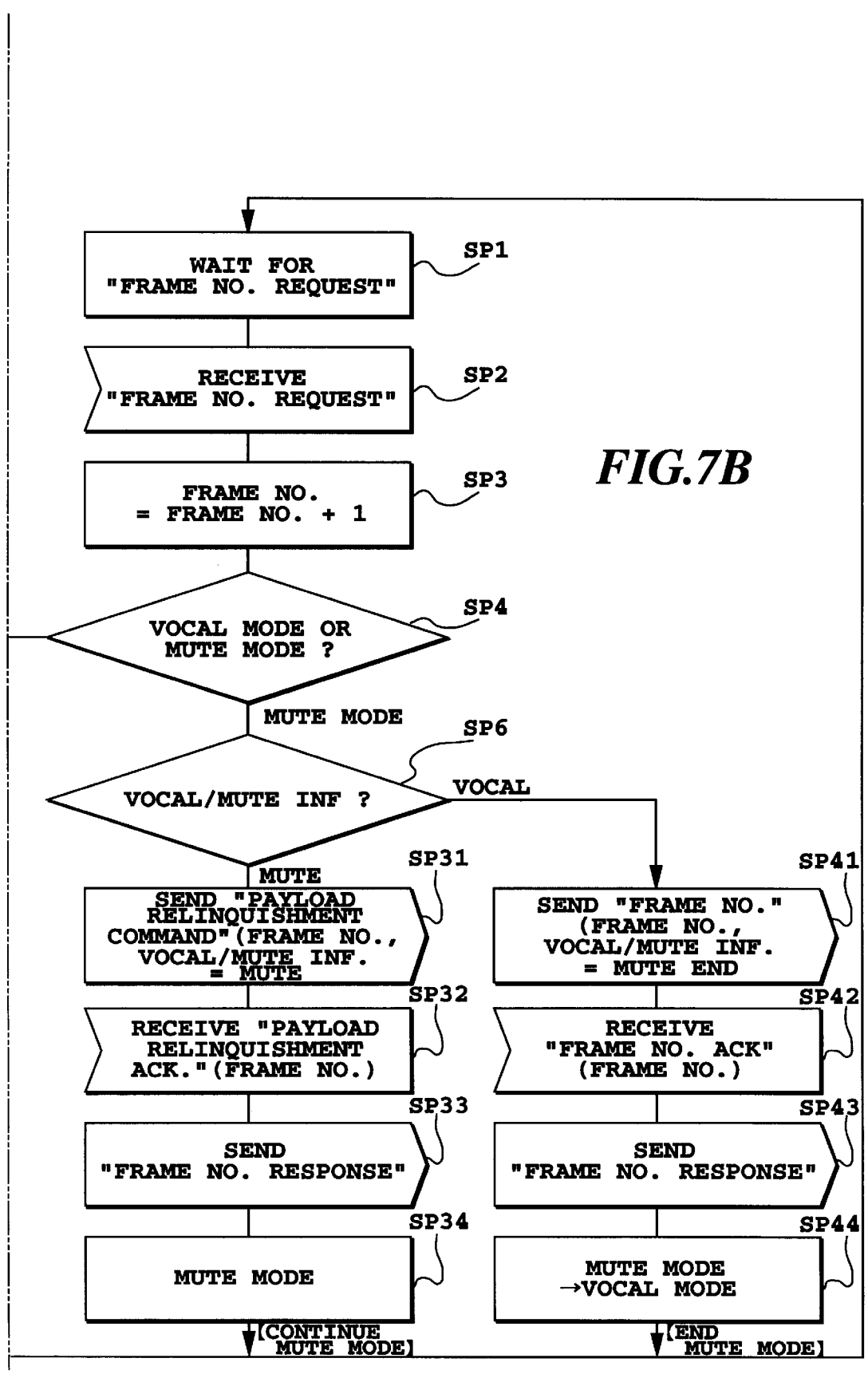

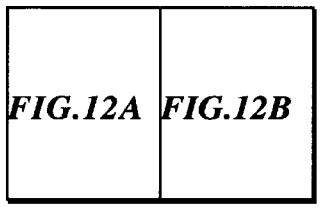
FIG.12
FIG.12A
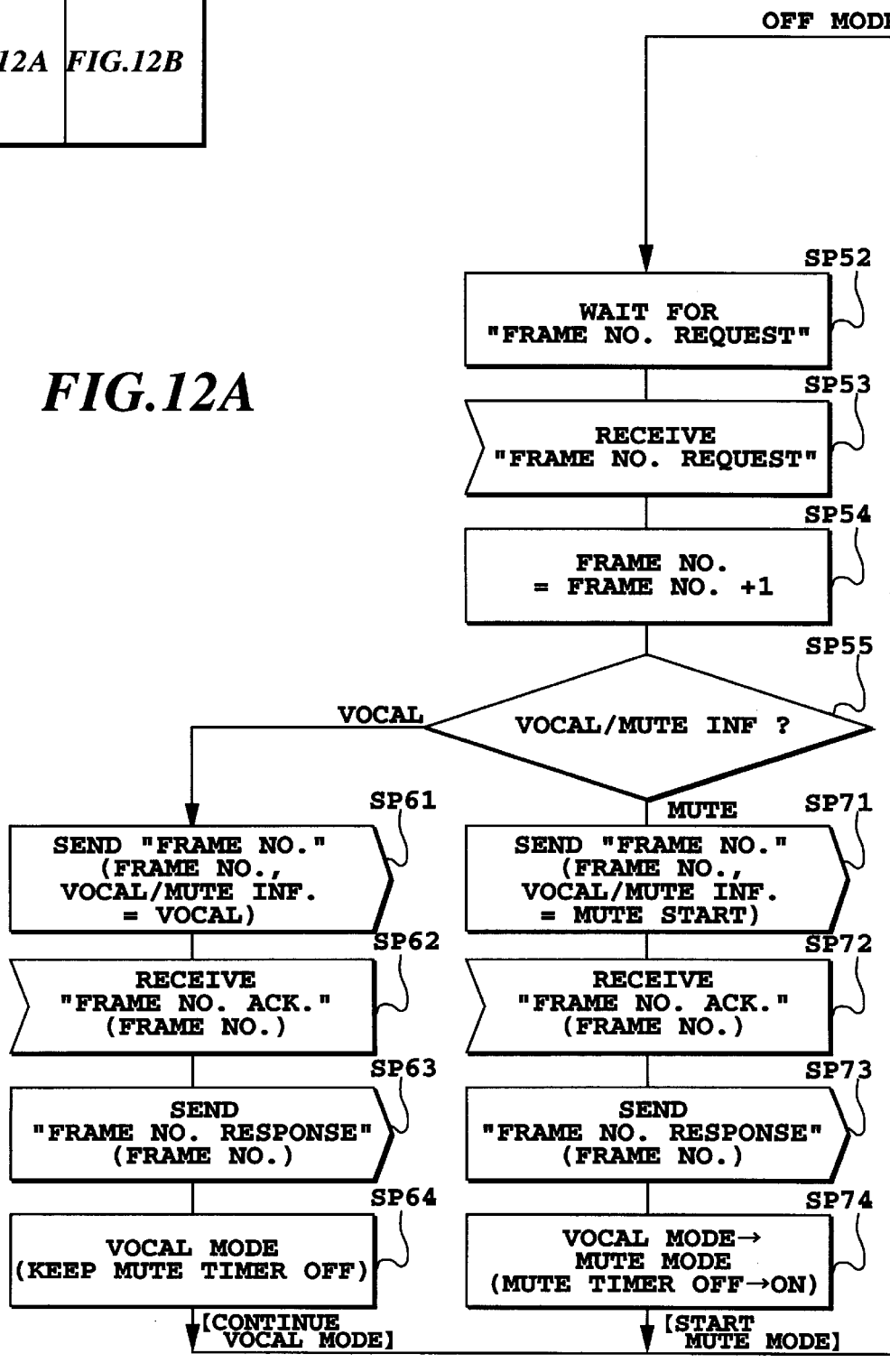

ATM TRANSMISSION METHOD HAVING SILENCE COMPRESSION CONTROLLING FUNCTION AND SYSTEM TRANSMITTER AND RECEIVER USING THE METHOD

TECHNICAL FIELD

The present invention relates to an ATM (Asynchronous Transfer Mode) transmission system, and more particularly to an ATM transmission method, and a system, transmitter and receiver using the same that can improve the channel efficiency by suppressing transmission of mute sections of voices.

BACKGROUND ART

A conventional ATM transmission system carries out transmission through a fixed band occupied on a channel between stations regardless of the presence or absence of speech as long as the call continues. Therefore, speech spurt cells are mixed with mute cells, thereby impairing the channel efficiency by an amount corresponding to the mute cells.

DISCLOSURE OF THE INVENTION

An object of the present invention is to provide an ATM transmission method, and a system, transmitter and receiver using the same, which have mute compression control function that can compress the mute sections by suppressing their transmission by notifying a party of the start and end of each of the mute sections.

In a first aspect of the present invention, there is provided an ATM (Asynchronous Transfer Mode) transmission method for transmitting input voice data using a cell consisting of a fixed length bit sequence, the ATM transmission method comprising the steps of:

at a transmitting side,
  detecting a mute section of the input voice data;
  generating a mute start cell for notifying a pair of a start of the mute section, and transmitting the mute start cell;
  suppressing the mute section as long as the mute section continues; and
  generating, when the mute section ends, a mute end cell for notifying the pair of an end of the mute section, and transmitting the mute end cell, and at a receiving side,
  starting generation of the mute section when the mute start cell is received; and
  stopping generation of the mute section when the mute end cell is received.

Here, the mute start cell and the mute end cell may be transmitted through a control channel other than a channel for transmitting the voice data.

The transmitting side may handle the input voice data on a frame-by-frame basis, and may detect the mute section frame by frame.

The receiving side may handle the voice data obtained from the cell on the frame-by-frame basis.

The receiving side may generate, after starting generation of the mute section, a mute frame every time a time period has elapsed corresponding to a length of the frame, and outputs the mute frame as the mute section.

The transmitting side may add to the frame a number indicating an input sequence, and may manage the frame in accordance with the number.

The receiving side may add to the frame a number indicating a generated sequence, and may manage the frame in accordance with the number.

The receiving side may release a channel if the mute end cell does not arrive for a predetermined time period after receiving the mute start cell.

In a second aspect of the present invention, there is provided an ATM (Asynchronous Transfer Mode) transmission system for transmitting input voice data using a cell consisting of a fixed length bit sequence, the ATM transmission system comprising:

in a transmitter,
  means for detecting a mute section of the input voice data;
  means for generating and transmitting a mute start cell for notifying a pair of a start of the mute section;
  means for suppressing the mute section as long as the mute section continues; and
  means for generating and transmitting, when the mute section ends, a mute end cell for notifying the pair of an end of the mute section; and in a receiver,
  means for starting generation of the mute section when the mute start cell is received; and
  means for stopping generation of the mute section when the mute end cell is received.

Here, the ATM transmission system may further comprise a control channel for transmitting the mute start cell and the mute end cell, the control channel being provided besides a channel for transmitting the voice data.

The transmitter may handle the input voice data on a frame-by-frame basis, and may further comprise means for detecting whether the frame is vocal or mute.

The receiver may comprise means for converting the voice data obtained from the received cell into the frame.

The receiver may further comprise a mute timer for counting an elapsed time after starting generation of the mute section, and means for generating a mute frame every time the mute counter counts a time period corresponding to a length of the frame.

The transmitter may further comprise means for adding to the frame a number indicating an input sequence, and may manage the frame in accordance with the number.

The receiver may further comprise means for adding to the frame a number indicating a generated sequence, and may manage the frame in accordance with the number.

The receiver may further comprise means for counting an elapsed time after receiving the mute start cell, and means for releasing a channel if the mute end cell does not arrive for a predetermined time period.

In a third aspect of the present invention, there is provided a transmitter for an ATM (Asynchronous Transfer Mode) transmission system for transmitting input voice data using a cell consisting of a fixed length bit sequence, the transmitter comprising:

means for detecting a mute section of the input voice data;
  means for generating and transmitting a mute start cell for notifying a pair of a start of the mute section;
  means for suppressing the mute section as long as the mute section continues; and
  means for generating and transmitting, when the mute section ends, a mute end cell for notifying the pair of an end of the mute section.

Here, the transmitter may further comprise means for feeding the mute start cell and the mute end cell to a control channel provided besides a channel for transmitting the voice data.

The transmitter may handle the input voice data on a frame-by-frame basis, and may further comprise means for detecting whether the frame is vocal or mute.

The transmitter may further comprise means for adding to the frame a number indicating an input sequence, wherein the transmitter manages the frame in accordance with the number.

In a fourth aspect of the present invention, there is provided a receiver for an ATM (Asynchronous Transfer Mode) transmission system for transmitting input voice data using a cell consisting of a fixed length bit sequence, the ATM transmission system including, in a transmitter, means for detecting a mute section of the input voice data, means for generating and transmitting a mute start cell for notifying a pair of a start of the mute section, means for suppressing the mute section as long as the mute section continues, and means for generating and transmitting, when the mute section ends, a mute end cell for notifying the pair of an end of the mute section, the receiver comprising:

means for starting generation of the mute section when the mute start cell is received; and means for stopping generation of the mute section when the mute end cell is received.

The receiver may further comprise means for receiving the mute start cell and the mute end cell, which are sent through a control channel provided besides a channel for transmitting the voice data.

The receiver may further comprise means for converting the voice data obtained from the received cell into a frame with a fixed length.

The receiver may further comprise a mute timer for counting an elapsed time after starting generation of the mute section, and means for generating a mute frame every time the mute counter counts a time period corresponding to a length of the frame.

The receiver may further comprise means for adding to the frame a number indicating a generated sequence, wherein the receiver manages the frame in accordance with the number.

The receiver may further comprise means for counting an elapsed time after receiving the mute start cell, and means for releasing a channel if the mute end cell does not arrive for a predetermined time period.

The present invention carries out mute compression by physically suppressing the mute sections by notifying the party of the start and end of each of the mute sections using the ATM that transfers the voices asynchronously. The mute compression makes it possible to improve the channel efficiency, and to increase the number of channels that can be accommodated.

Incidentally, the synchronous transfer mode (STD) which is the main stream of present transmission systems exchanges voices at fixed timings while establishing synchronization between transmitting and receiving stations. In this case, the synchronization will be lost by suppressing the mute sections. Thus, the normal information transfer cannot be ensured, and hence the mute compression becomes difficult in the STD system.

BRIEF DESCRIPTION OF THE DRAWINGS

FIGS. 1A and 1B are block diagrams showing an embodiment 1 of an ATM transmission system with a mute compression control function in accordance with the present invention, wherein FIG. 1A shows a transmitter of the system, and FIG. 1B shows a receiver thereof;

FIGS. 7, 7A, 7B show a flowchart illustrating the operation of the transmitter of the embodiment 1;

FIGS. 12, 12A, 12B show a flowchart illustrating the operation of the receiver of the embodiment 1;

FIGS. 13A and 13B are block diagrams showing an embodiment 2 of an ATM transmission system with the mute compression control function in accordance with the present invention, wherein FIG. 13A shows a transmitter of the system, and FIG. 13B shows a receiver thereof;

BEST MODE FOR CARRYING OUT THE INVENTION

The embodiments of the present invention will now be described with reference to the accompanying drawings.

Embodiment 1

Figure 1A:
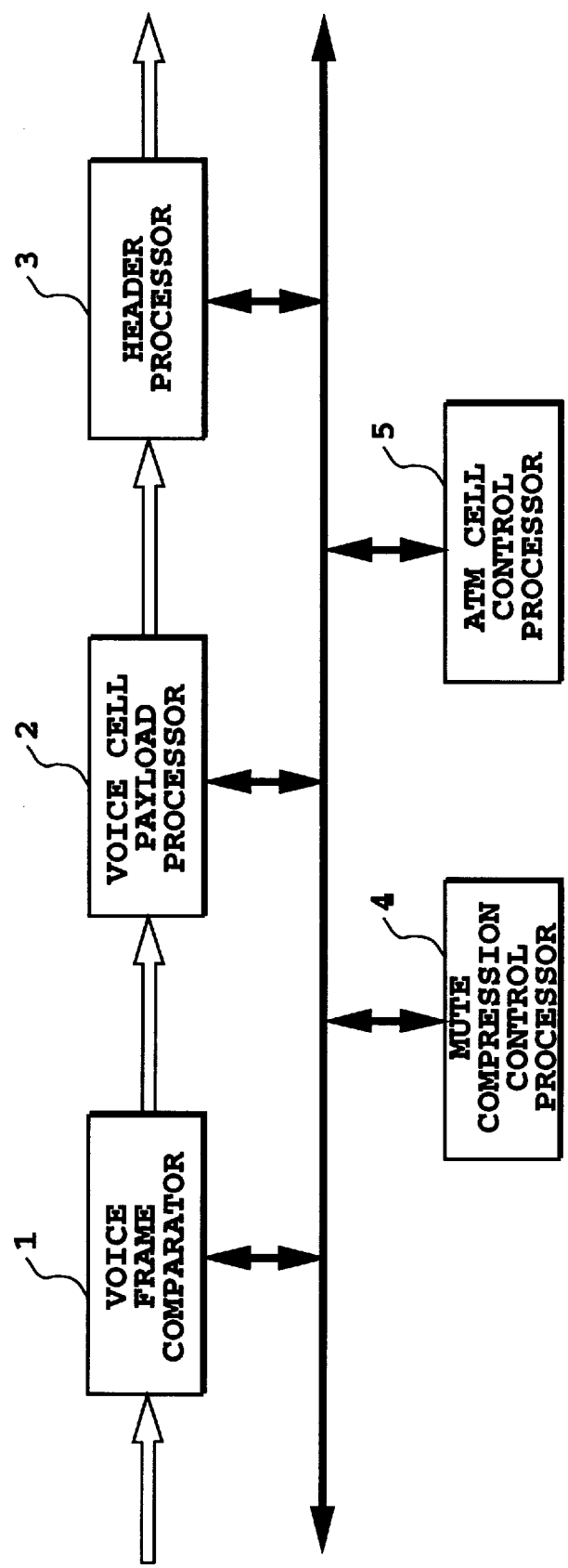
Figure 1B:
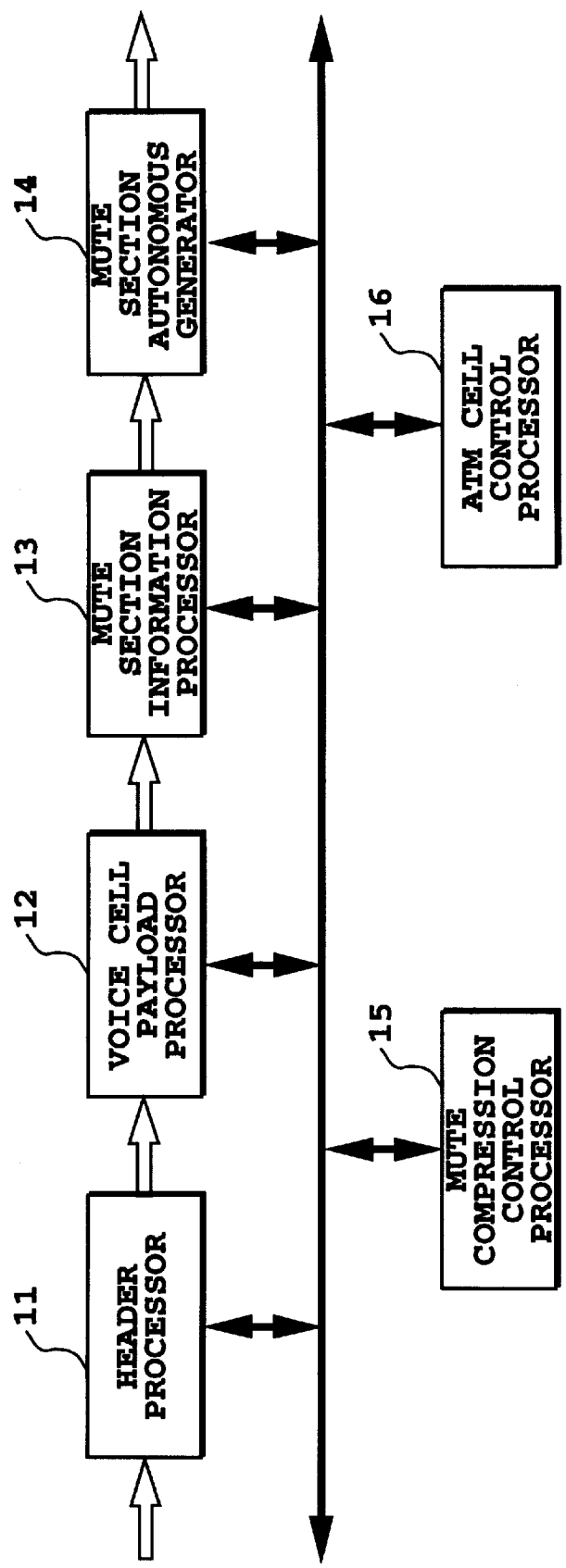

FIGS. 1A and 1B are block diagrams showing an embodiment 1 of an ATM transmission system with a mute compression control function in accordance with the present invention, wherein FIG. 1A shows a transmitter, and FIG. 1B shows a receiver.

In the transmitter of FIG. 1A, a voice frame comparator 1, a voice cell payload processor 2 and a header processor 3 constitute a channel system, and a mute compression control processor 4 and an ATM cell control processor 5 constitute a control system. The channel system and the control system are interconnected through a bus. Likewise, in the receiver of FIG. 1B, a header processor 11, a voice cell payload processor 12, a mute section information processor 13 and a mute section autonomous generator 14 constitute a channel system, and a mute compression control processor 15 and an ATM control processor 16 constitute a control system. The channel system and the control system are interconnected through a bus.

In FIG. 1A, the voice frame comparator 1 compares a voice frame input thereto with a reference frame prestored therein, and decides whether the voice frame is vocal or mute, that is, whether it includes voice data or not. The voice cell payload processor 2 generates a payload of the voice cell. More specifically, when speech-spurt voice frames come successively, it generates a payload of the voice cell by combining the voice data of multiple voice frames; when the voice frame changes from vocal to mute, it generates a mute start cell; and when the voice frame changes from mute to vocal, it generates a mute end cell.

Figure 2:
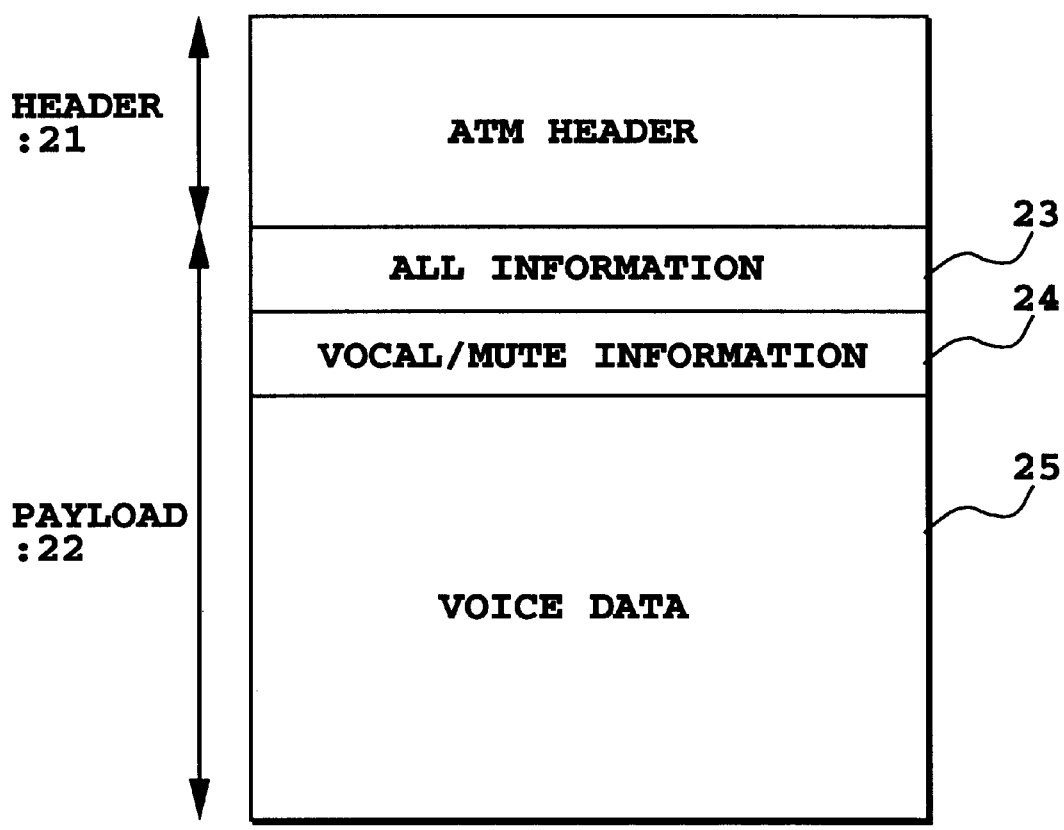
FIG. 2 is a schematic diagram illustrating the structure of a voice cell used in the embodiment 1.

FIG. 2 is a diagram illustrating a structural example of the voice cell. As shown in this figure, the voice cell has a structure in which vocal/mute information is added to a standard ATM cell for indicating whether the voice cell is vocal or mute. The standard ATM cell consists of a 5-byte ATM header 21 and a 48-byte payload 22, in which AAL (ATM Adaptation Layer) information 23 and vocal/mute information 24 are provided, and voice data 25 is written in its remaining portion. The vocal/mute information 24 can indicate the vocal/mute by turning on/off a particular bit, or by using a predetermined pattern.

Returning to FIG. 1A, the header processor 3 generates the voice cell 20 by adding the header 21 to an ATM cell payload fed from the voice cell payload processor 2. The header 21 is formed on the basis of ATM header information supplied from the ATM cell control processor 5. Since the ATM cell control processor 5 is known, its description will be omitted here. The mute compression control processor 4 carries out the compression control of a mute frame. Its details will be described later.

In the receiver as shown in FIG. 1B, the header processor 11 selects a voice cell addressed to the receiver from the received voice cell 20, and supplies the voice cell payload processor 12 with the payload of the voice cell (ATM cell). In this case, the address of the voice cell is identified by the ATM cell control processor 16.

The voice cell payload processor 12 extracts the payload from the voice cell, picks up the vocal/mute information 24 from the payload, and supplies the vocal/mute information 24 to the mute compression control processor 15. In addition, it receives the frame number from the mute compression control processor 15, and supplies the mute section information processor 13 with the frame number together with the contents of the payload (voice data 25) and vocal/mute information 24. For example, when the voice cell is a speech spurt cell, the voice cell payload processor 12 divides the payload into lengths corresponding to the voice frame, and requires the mute compression control processor 15 to provide a frame number for each division. On the other hand, when the voice cell is a mute start cell or mute end cell, the voice cell payload processor 12 requires the mute compression control processor 15 to provide a frame number only once. The frame numbers thus provided by the mute compression control processor 15 are supplied to the mute section information processor 13 together with the voice data 25 and vocal/mute information 24.

The mute section information processor 13 generates the voice frame from the information fed from the voice cell payload processor 12. Specifically, when the voice cell is a speech-spurt cell, it generates a voice frame including the voice data, whereas when the voice cell is a mute start cell or mute end cell, it generates a voice frame corresponding thereto.

The mute section autonomous generator 14, automatically generates a mute frame at a fixed frame interval when nothing is received, that is, when the mute state continues after receiving the mute start cell.

The mute compression control processor 15, including a mute timer 15A, starts the mute timer 15A when it receives the mute start cell, and stops the mute timer 15A when it receives the mute end cell. The mute timer 15A counts the fixed frame interval. The mute compression control processor 15 increments the frame number each time the frame interval elapses, and provides the mute section autonomous generator 14 with a mute frame transmission command. As a result, the mute frames are generated at the fixed interval while the mute state continues. The ATM cell control processor 16 is known, and hence its description is omitted here.

Figure 6:
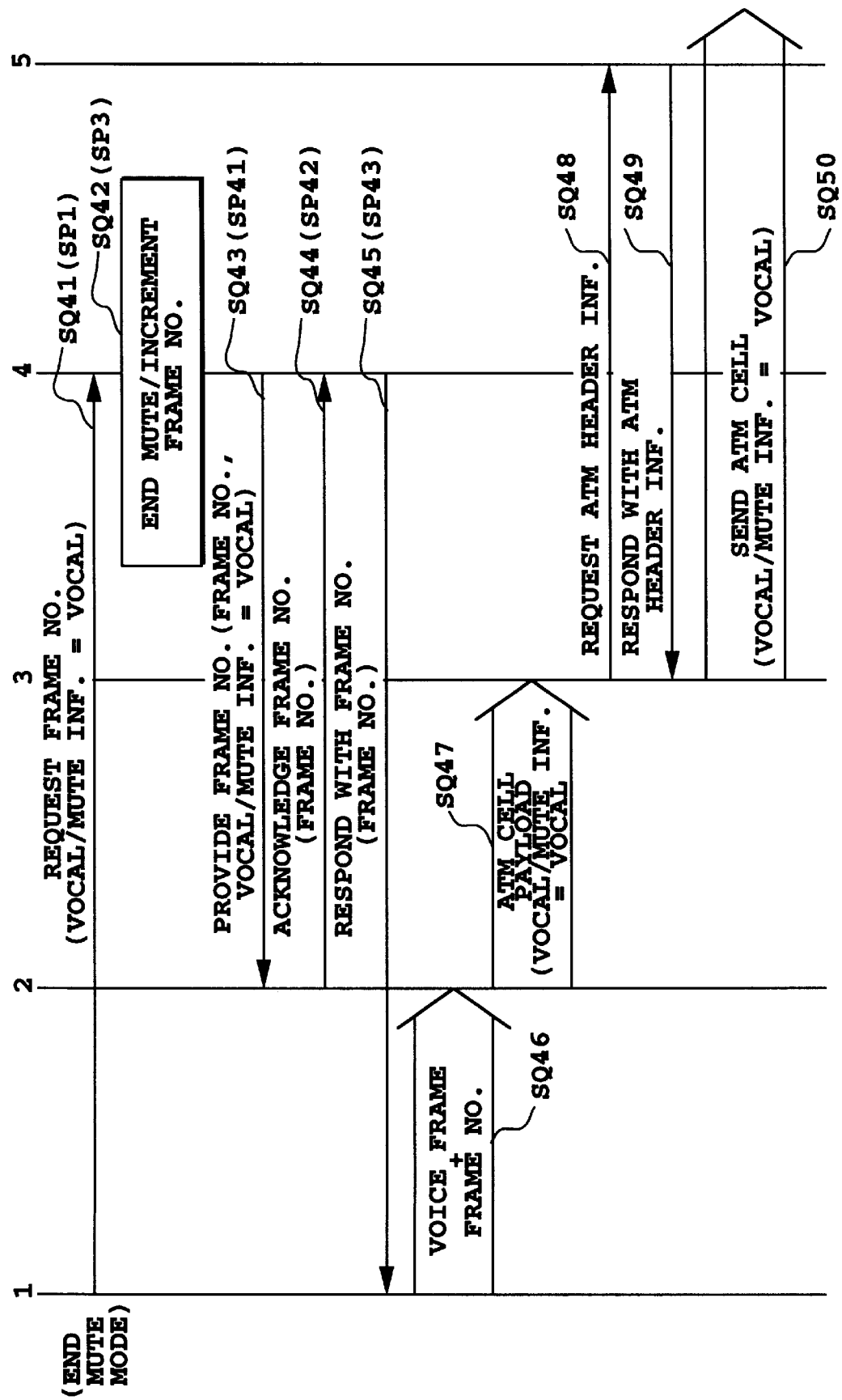
FIG. 6 is a sequence chart illustrating the final stage of the mute processing in the transmitter of the embodiment 1.
Figure 7:
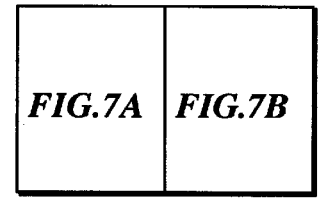
Figure 7A:
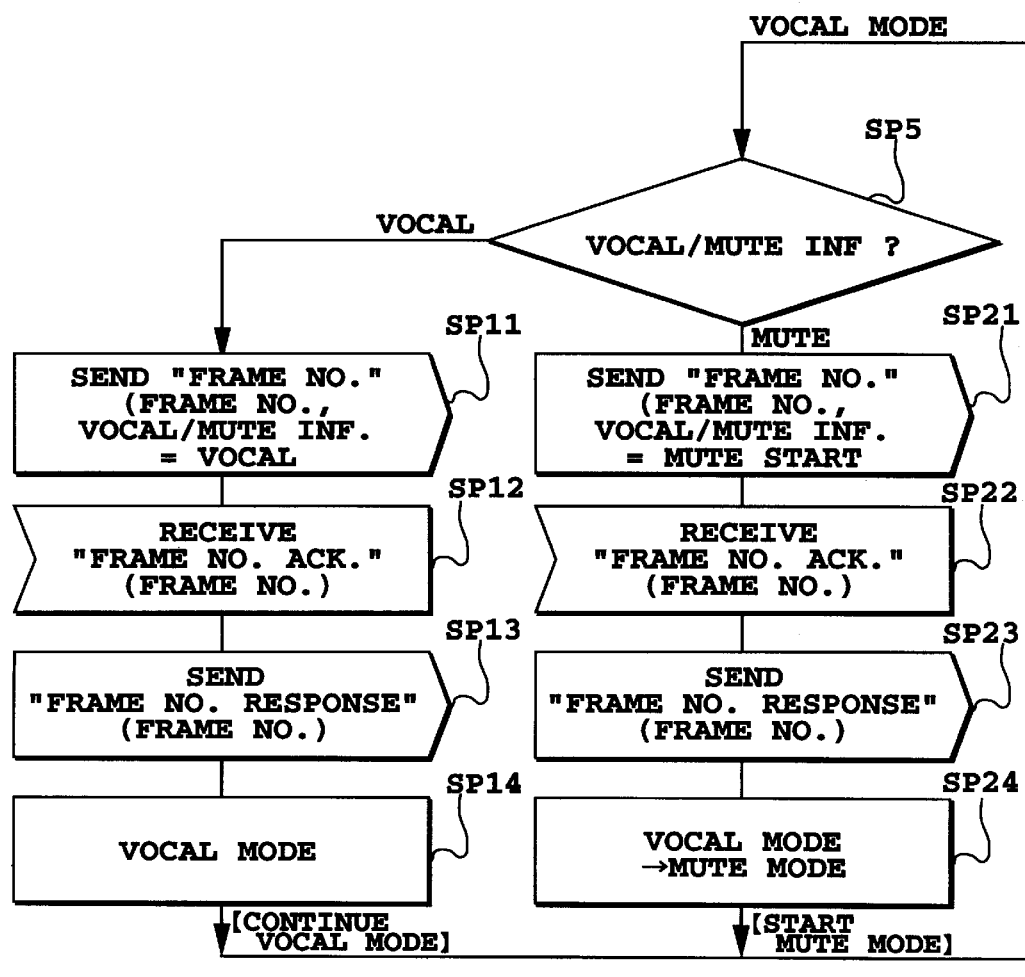

Next, the transmitting operation of the present embodiment will be described with reference to the sequence charts of FIGS. 3–6, and the flowchart of FIG. 7 illustrating the operation of the mute compression control processor 4. In the following description, the step number SP in a parentheses after the sequence number SQ in each sequence chart indicates the corresponding step number of the flowchart.

(1) Transmission Processing of the Speech-Spurt Frame

Figure 3:
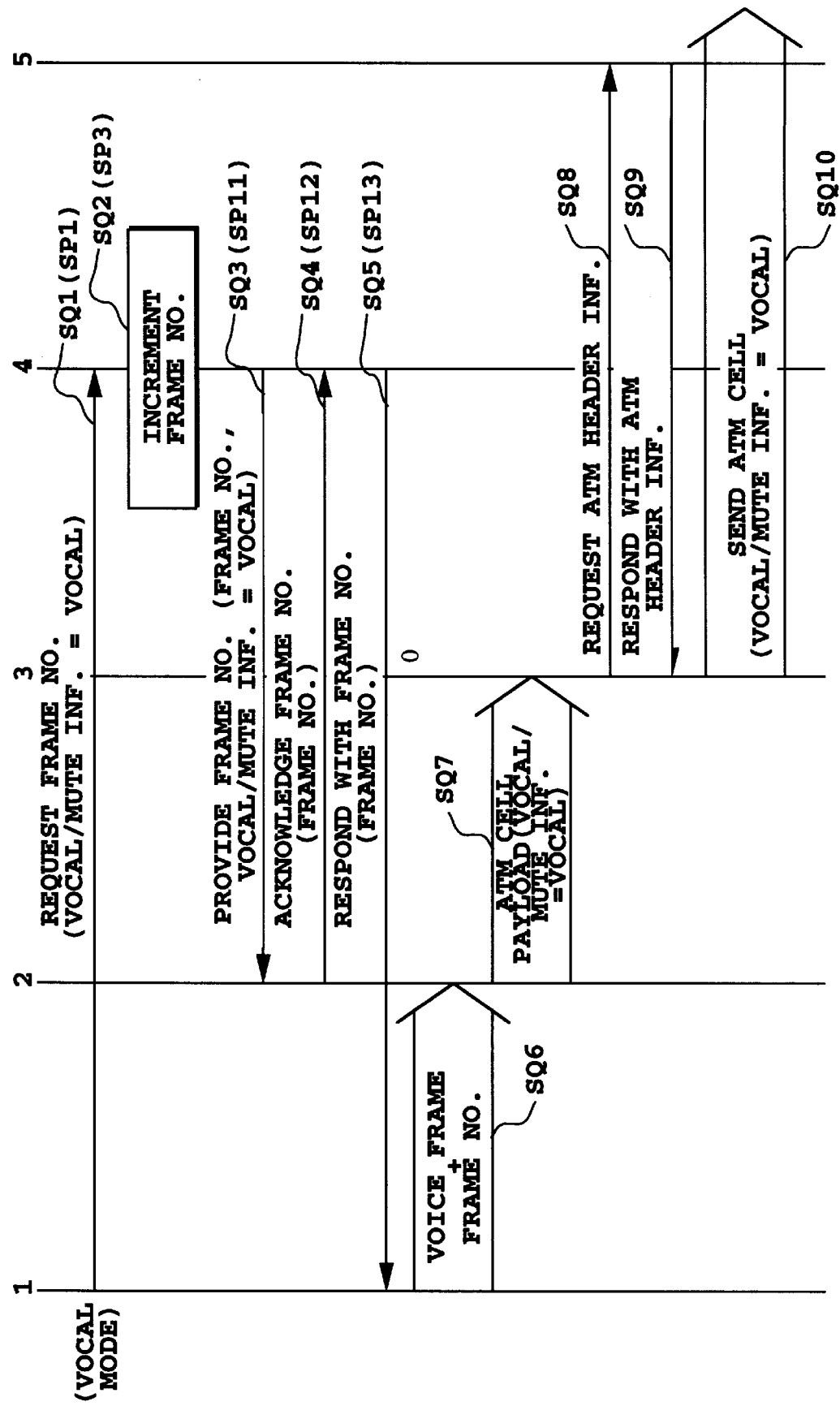
FIG. 3 is a sequence chart illustrating the processing of a speech spurt frame in the transmitter of the embodiment 1.

FIG. 3 is a sequence chart illustrating the transmission processing of the speech-spurt frame.

The voice frame comparator 1 makes a decision whether the input voice frame is a vocal or mute. In this case, since the voice frame is vocal, it sets the vocal/mute information= vocal, and sends a frame number request to the mute compression control processor 4 (sequence SQ1). Receiving the frame number request, the mute compression control processor 4 increments the frame number (SQ2), and delivers the frame number to the voice frame comparator 1 and voice cell payload processor 2. The purpose of this is to prevent the frame sequence from being confused between the voice frame comparator 1 and voice cell payload processor 2. The mute compression control processor 4 provides first the voice cell payload processor 2 with the frame number together with the vocal/mute information (SQ3). Receiving the frame number, the voice cell payload processor 2 sends back the received frame number to the mute compression control processor 4, thus acknowledging the reception of the frame number (SQ4). Then, the mute compression control processor 4 sends back the frame number to the voice frame comparator 1 (SQ5) which in turn provides the voice cell payload processor 2 with the frame number and the input voice frame (SQ6). The processings from sequence SQ1 to SQ6 are iterated each time the voice frame is input until the voice cell payload processor 2 obtains the voice data for the payload of one voice cell. When obtaining the voice data for one payload, the voice cell payload processor 2 requests the header processor 3 to generate the ATM cell (voice cell).

More specifically, the voice cell payload processor 2 adds the vocal/mute information 24 to the voice data generated from the multiple voice frames to generate the payload of the voice cell, and supplies the header processor 3 with the payload (SQ7). The header processor 3 requests the ATM cell control processor 5 to send the ATM header information (SQ8), and when receiving it (SQ9), it generates the ATM cell (voice cell) 20 by adding the header 21 to the payload 22, and sends the ATM cell to the receiver (SQ10).

These processings correspond to steps SP1–SP5 and SP11–SP14 in the flowchart of FIG. 7. Specifically, when the frame number request is sent from the voice frame comparator 1 while waiting for the frame number request (step SP1), the mute compression control processor 4 receives it (SP2), and increments the frame number (SP3). Then, the mute compression control processor 4 makes a decision whether the current operation mode is a vocal mode or mute mode (SP4), and decides in the vocal mode whether the vocal/mute information sent from the voice frame comparator 1 is vocal or mute (SP5). Since it is vocal in this case, the processing proceeds to step SP11 and sends the frame number together with the vocal/mute information to the voice cell payload processor 2. Receiving the frame number acknowledgement from the voice cell payload processor 2 (SP12), the mute compression control processor 4 sends the frame number to the voice frame comparator 1 (SP13), and continues the vocal mode (SP14).

(2) Transmission Processing at the Initial Stage in the Mute Mode

Figure 4:
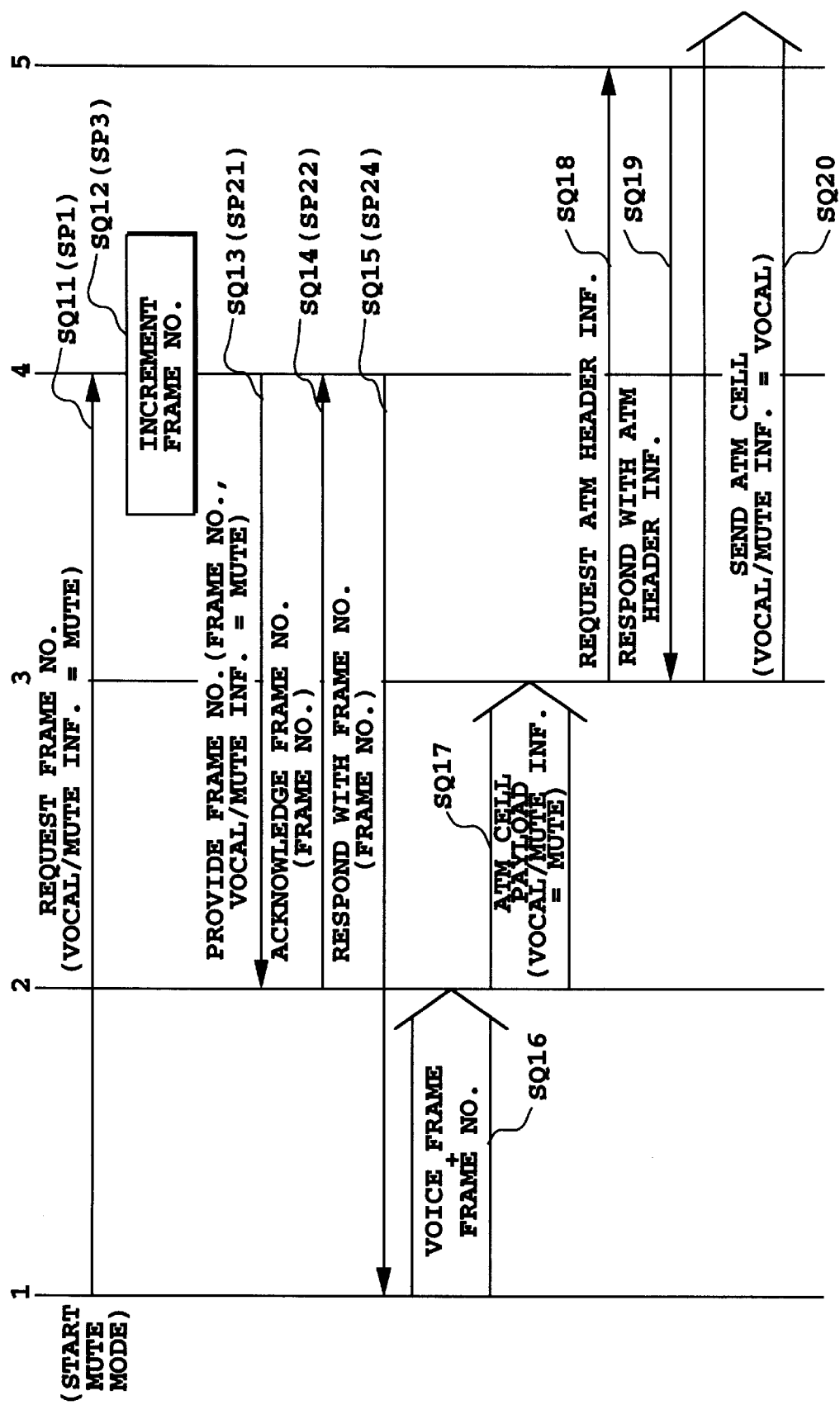
FIG. 4 is a sequence chart illustrating the initial stage of a mute processing in the transmitter of the embodiment 1.

FIG. 4 is a sequence chart illustrating the transmission processing at the initial stage in the mute mode.

The voice frame comparator 1 makes a decision whether the input voice frame is vocal or mute. Since it is mute in this case, it sets the vocal/mute information=mute, and requests the mute compression control processor 4 to send the frame number (sequence SQ11). Receiving the frame number request, the mute compression control processor 4 increments the frame number (SQ12), and delivers the frame number to the voice frame comparator 1 and voice cell payload processor 2. The mute compression control processor 4 provides first the voice cell payload processor 2 with the frame number together with the vocal/mute information indicating that the frame is a mute frame (SQ13). Receiving the frame number, the voice cell payload processor 2 sends back the received frame number to the mute compression control processor 4, thus acknowledging the reception of the frame number (SQ14). Then, the mute compression control processor 4 sends back the frame number to the voice frame comparator 1 (SQ15) which in turn provides the voice cell payload processor 2 with the frame number and the input voice frame (SQ16). After that, the voice cell payload processor 2 requests the header processor 3 to generate the ATM cell (voice cell).

More specifically, the voice cell payload processor 2 adds the vocal/mute information 24 to the mute input voice frame to generate the payload of the voice cell, and supplies the header processor 3 with the payload (SQ17). The header processor 3 requests the ATM cell control processor 5 to send the ATM header information (SQ18), and when receiving it (SQ19), it generates the ATM cell (mute start cell) by adding the header to the payload, and sends the ATM cell to the receiver (SQ20).

These processings correspond to steps SP1–SP5 and SP21–SP24 in the flowchart of FIG. 7. Specifically, when the frame number request is sent from the voice frame comparator 1 while waiting for the frame number request (step SP1), the mute compression control processor 4 receives it (SP2), and increments the frame number (SP3). Then, the mute compression control processor 4 makes a decision whether the current operation mode is the vocal mode or mute mode (SP4), and decides in the vocal mode whether the vocal/mute information sent from the voice frame comparator 1 is vocal or mute (SP5). Since it is mute in this case, the processing proceeds to step SP21 and sends the frame number together with the vocal/mute information indicative of the mute start to the voice cell payload processor 2. Receiving the frame number acknowledgement from the voice cell payload processor 2 (SP22), the mute compression control processor 4 sends a frame number response to the voice frame comparator 1 (SP23), and switches the vocal mode to the mute mode (SP24), thereby starting the mute mode.

(3) Transmission Processing at the Intermediate Stage in the Mute Mode

Figure 5:
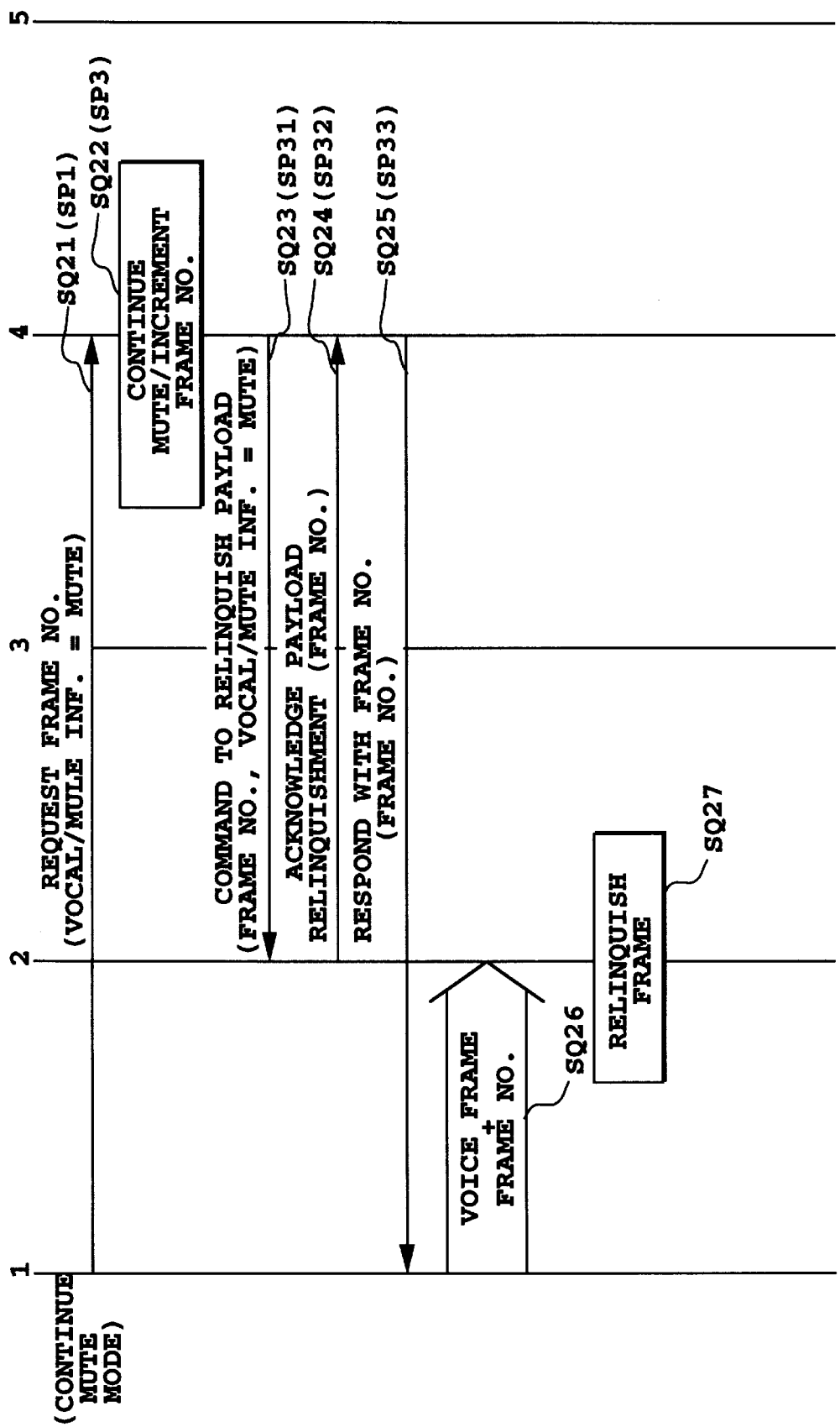
FIG. 5 is a sequence chart illustrating the intermediate stage of the mute processing in the transmitter of the embodiment 1.

FIG. 5 is a sequence chart illustrating the transmission processing at the intermediate stage in the mute mode.

The voice frame comparator 1 makes a decision whether the input voice frame is vocal or mute. Since it is mute in this case, it sets the vocal/mute information=mute, and requests the mute compression control processor 4 to send the frame number (sequence SQ21). Receiving the frame number request, the mute compression control processor 4 increments the frame number (SQ22), and sends a payload relinquishment command to the voice cell payload processor 2 (SQ23). The command includes the vocal/mute information indicating that the frame is a mute frame.

Receiving the payload relinquishment command, the voice cell payload processor 2 sends back the received frame number to the mute compression control processor 4, thus acknowledging the reception of the payload relinquishment command (SQ24). Then, the mute compression control processor 4 sends the response to the frame number request to the voice frame comparator 1, that is, sends back the frame number to the voice frame comparator 1 (SQ25) which in turn provides the voice cell payload processor 2 with the frame number and the input voice frame (SQ26). Thus, the voice cell payload processor 2 relinquishes the input voice frame (SQ27) to suppress the generation of the voice cell. These sequences SQ21–SQ27 are iterated each time a mute voice frame is input until a speech-spurt voice frame is input.

These processings correspond to steps SP1–SP4, SP6 and SP31–SP34 in the flowchart of FIG. 7. Specifically, when the frame number request is sent from the voice frame comparator 1 while waiting for the frame number request (step SP1), the mute compression control processor 4 receives it (SP2), and increments the frame number (SP3). Then, the mute compression control processor 4 makes a decision whether the current operation mode is the vocal mode or mute mode (SP4), and decides in the mute mode whether the vocal/mute information sent from the voice frame comparator 1 is vocal or mute (SP6). Since it is mute in this case, the processing proceeds to step SP31 and sends the payload relinquishment command to the voice cell payload processor 2. Receiving the acknowledgement of the reception of the payload relinquishment command from the voice cell payload processor 2 (SP32), the mute compression control processor 4 sends a frame number response to the voice frame comparator 1 (SP33), and continues the mute mode (SP34).

(4) Transmission Processing at the Final Stage in the Mute Mode

FIG. 6 is a sequence chart illustrating the transmission processing at the final stage in the mute mode.

The voice frame comparator 1 makes a decision whether the input voice frame is vocal or mute. Since it is vocal in this case, it sets the vocal/mute information=vocal, and requests the mute compression control processor 4 to send the frame number (sequence SQ41). Receiving the frame number request, the mute compression control processor 4 increments the frame number (SQ42), and provides the voice cell payload processor 2 with the frame number including the mute end information together with the vocal/mute information indicating that the frame is a speech spurt frame (SQ43). Receiving the frame number, the voice cell payload processor 2 sends back the received frame number to the mute compression control processor 4, thus acknowledging the reception of the frame number (SQ44). Then, the mute compression control processor 4 sends a response to the frame number request to the voice frame comparator 1, that is, sends back the frame number to the voice frame comparator 1 (SQ45) which in turn provides the voice cell payload processor 2 with the frame number and the input voice frame (SQ46). After that, the voice cell payload processor 2 requests the header processor 3 to generate the ATM cell (voice cell).

More specifically, the voice cell payload processor 2 adds the vocal/mute information 24 to the speech-spurt input voice frame to generate the payload of the voice cell, and supplies the header processor 3 with the payload (SQ47). The header processor 3 requests the ATM cell control processor 5 to send the ATM header information (SQ48), and when receiving it (SQ49), it generates the ATM cell (voice cell) 20 by adding the header 21 to the payload 22, and sends the ATM cell to the receiver (SQ50).

These processings correspond to steps SP1–SP4, SP6 and SP41–SP44 in the flowchart of FIG. 7. Specifically, when the frame number request is sent from the voice frame comparator 1 while waiting for the frame number request (step SP1), the mute compression control processor 4 receives it (SP2), and increments the frame number (SP3). Then, the mute compression control processor 4 makes a decision whether the current operation mode is the vocal mode or mute mode (SP4), and decides in the mute mode whether the vocal/mute information sent from the voice frame comparator 1 is vocal or mute (SP6). Since it is vocal in this case, the processing proceeds to step SP41 and sends the frame number to the voice cell payload processor 2. Receiving the frame number acknowledgement from the voice cell payload processor 2 (SP42), the mute compression control processor 4 sends a frame number response to the voice frame comparator 1 (SP43), and switches the mute mode to the vocal mode (SP44), thereby terminating the mute mode and starting the vocal mode.

Figure 11:
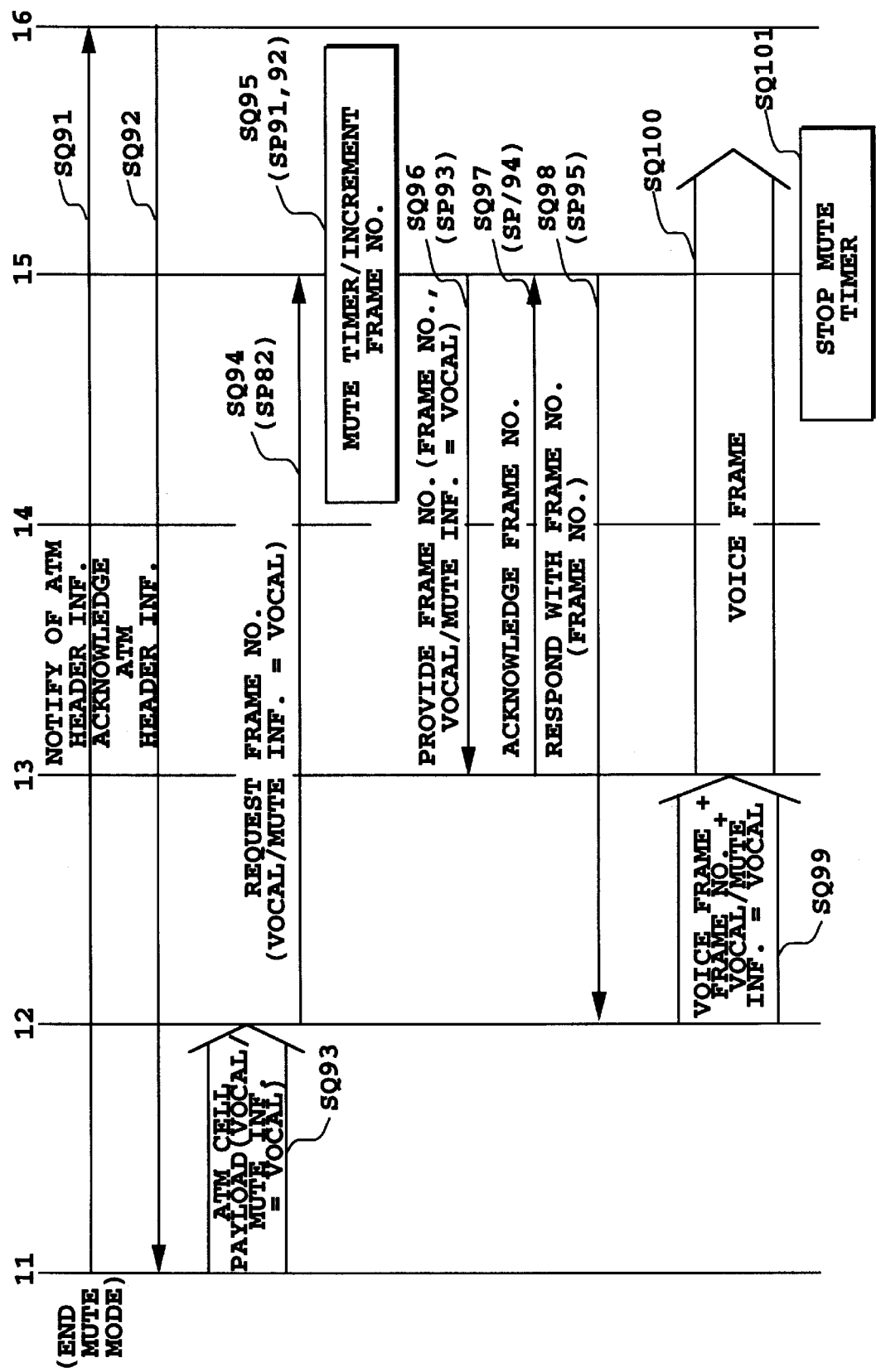
FIG. 11 is a sequence chart illustrating the final stage of the mute processing in the receiver of the embodiment 1.
Figure 12B:
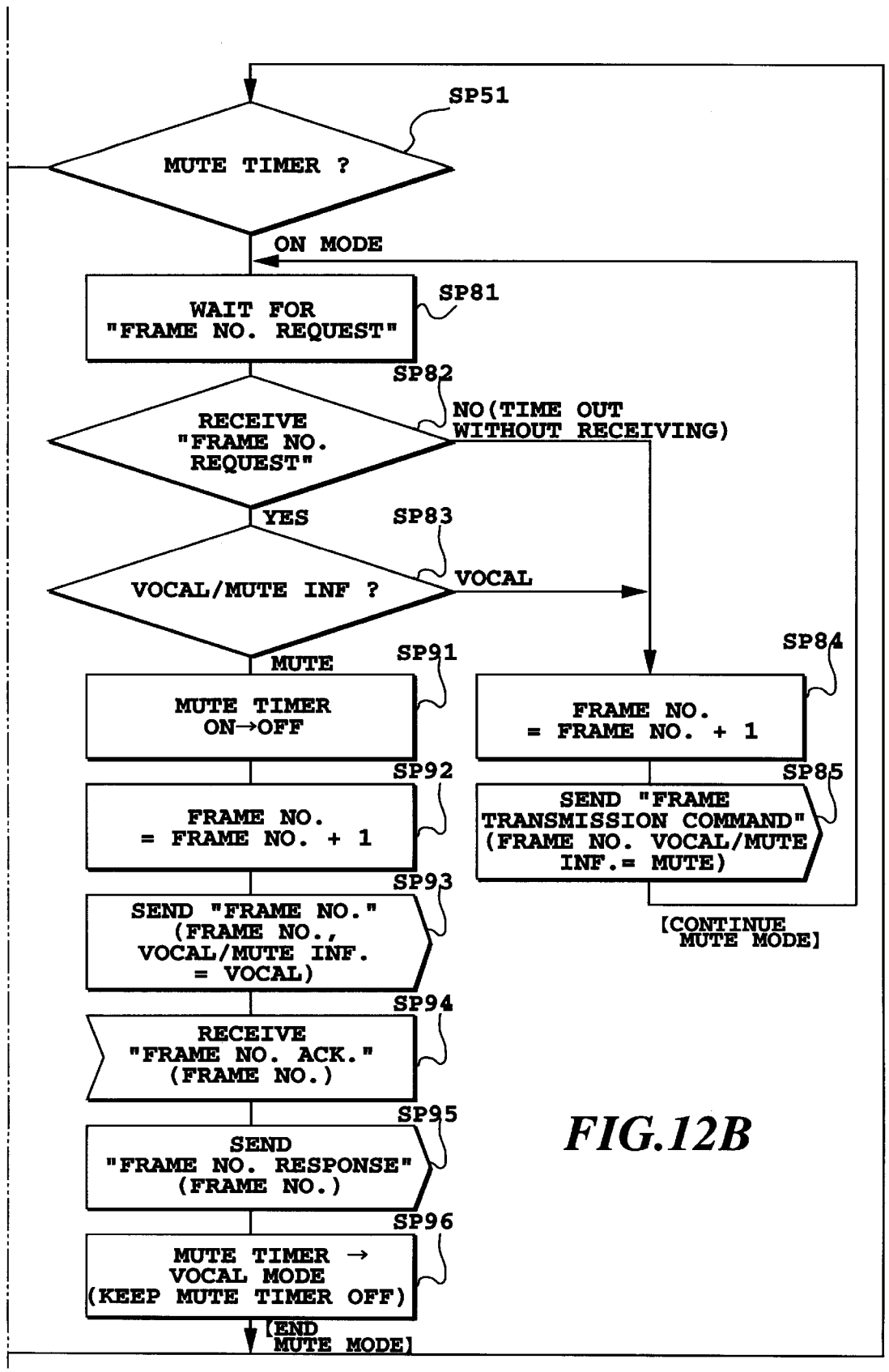

Next, the receiving processing of the embodiment will be described with reference to the sequence charts of FIGS. 8–11, and the flowchart of FIG. 12 illustrating the operation of the mute compression control processor 15.

(1) Receiving Processing of the Speech-Spurt Voice Cell

Figure 8:
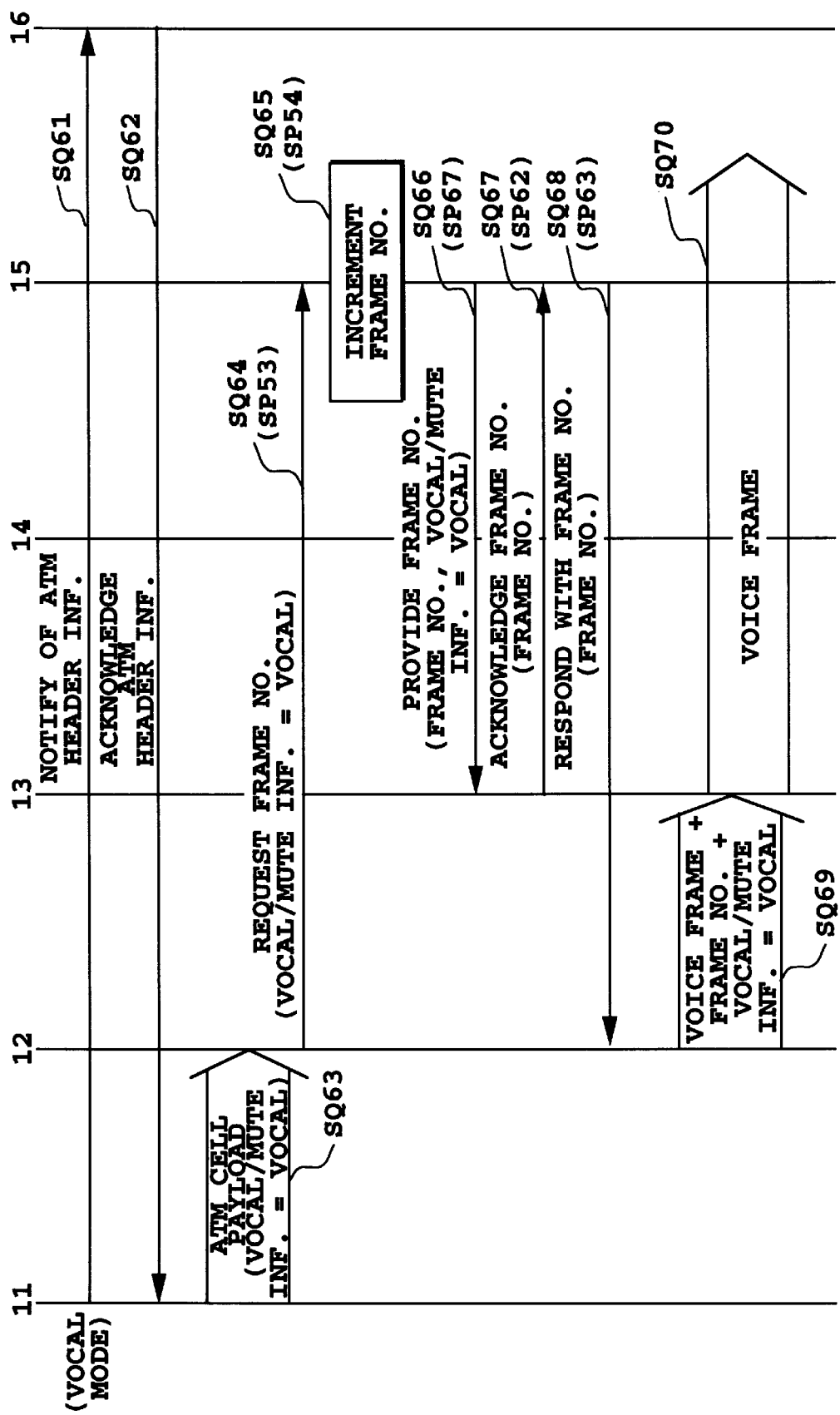
FIG. 8 is a sequence chart illustrating the processing of a speech spurt cell in the receiver of the embodiment 1.

FIG. 8 is a sequence chart illustrating the receiving processing of the speech-spurt voice cell.

Receiving the voice cell sent from the transmitter, the header processor 11 of the receiver provides the ATM cell control processor 16 with the ATM header information in the voice cell (SQ61). The ATM cell control processor 16 makes a decision whether the voice cell is addressed to the receiver using the ATM header information, and sends back the acknowledgement of the ATM header information to the header processor 11 (SQ62). When the voice cell is addressed to the receiver, the header processor 11 supplies the payload of the voice cell to the voice cell payload processor 12 (SQ63). In this case, the payload includes the vocal/mute information 24 which is vocal.

Receiving the payload from the header processor 11, the voice cell payload processor 12 divides the payload to pieces of data, each piece having a frame length, and sends the frame number request together with the vocal/mute information 24 to the mute compression control processor 15 (SQ64). Receiving the frame number request, the mute compression control processor 15 increments the frame number (SQ65), and delivers the frame number to the voice cell payload processor 12 and mute section information processor 13. The purpose of this is to prevent the frame sequence from being confused between the voice cell payload processor 12 and mute section information processor 13. The mute compression control processor 15 first provides the mute section information processor 13 with the frame number together with the vocal/mute information indicating that the frame is a speech-spurt voice frame (SQ66). Receiving the frame number, the mute section information processor 13 sends back a frame number acknowledgement to the mute compression control processor 15 (SQ67). Then, the mute compression control processor 15 sends back the frame number to the voice cell payload processor 12 (SQ68) which in turn provides the mute section information processor 13 with the frame number and the received voice frame (SQ69). The mute section information processor 13 outputs the voice frame (SQ70). The processings from sequence SQ64 to SQ70 are iterated until the data in the payload are exhausted, during which the voice frames are sequentially output.

These processings correspond to steps SP51–SP55 and SP61–SP64 in the flowchart of FIG. 12. Specifically, when the frame number request is sent from the voice cell payload processor 12 while the mute timer 15A is in an OFF mode (step SP51) and the mute compression control processor 15 is waiting for the frame number request (step SP52), the mute compression control processor 15 receives it (SP53), and increments the frame number (SP54). Then, the mute compression control processor 15 makes a decision whether the vocal/mute information sent from the voice cell payload processor 12 is vocal or mute (SP55). Since it is vocal in this case, the processing proceeds to step SP61 and sends the frame number together with the vocal/mute information to the mute section information processor 13. Receiving the frame number acknowledgement from the mute section information processor 13 (SP62), the mute compression control processor 15 sends the frame number to the voice cell payload processor 12 (SP63), and continues the vocal mode (SP64) with maintaining the mute timer 15A in the OFF state.

(2) Receiving Processing at the Initial Stage in the Mute Mode

Figure 9:
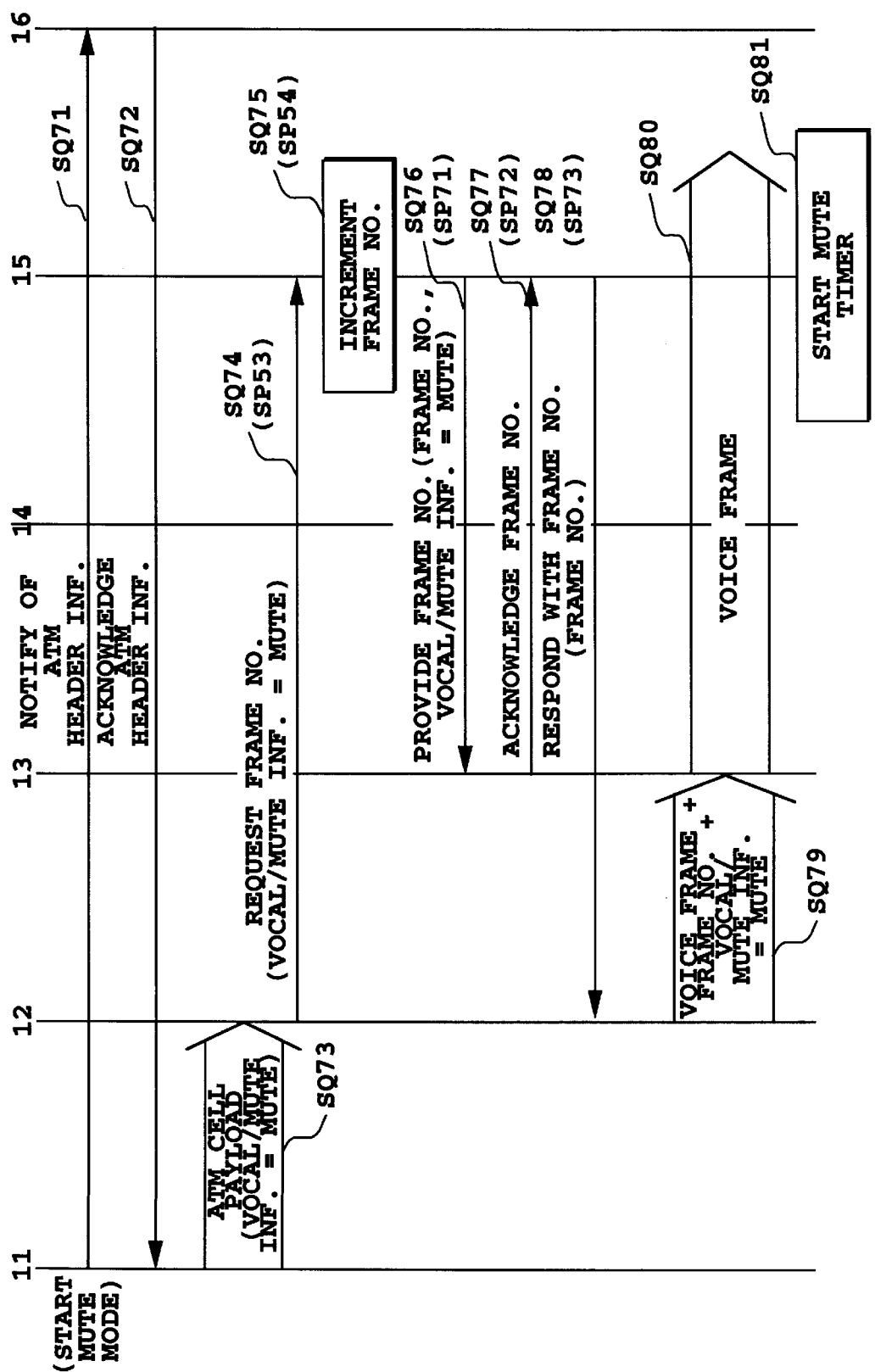
FIG. 9 is a sequence chart illustrating the initial stage of a mute processing in the receiver of the embodiment 1.

FIG. 9 is a sequence chart illustrating the receiving processing at the initial stage in the mute mode.

Receiving the voice cell sent from the transmitter, the header processor 11 provides the ATM cell control processor 16 with the ATM header information in the voice cell (SQ71). The ATM cell control processor 16 makes a decision whether the voice cell is addressed to the receiver using the ATM header information, and sends back the acknowledgement of the ATM header information to the header processor 11 (SQ72). When the voice cell is addressed to the receiver, the header processor 11 supplies the payload of the voice cell to the voice cell payload processor 12 (SQ73). The payload includes the vocal/mute information 24 which is mute in this case.

Receiving the payload from the header processor 11, the voice cell payload processor 12 sends the frame number request together with the vocal/mute information 24 to the mute compression control processor 15 (SQ74). Receiving the frame number request, the mute compression control processor 15 increments the frame number (SQ75), and sends the frame number and the vocal/mute information indicating that the frame is mute to the mute section information processor 13 (SQ76). Receiving the frame number, the mute section information processor 13 sends back a frame number acknowledgement to the mute compression control processor 15 (SQ77). Then, the mute compression control processor 15 sends back the frame number to the voice cell payload processor 12 (SQ78) which in turn provides the mute section information processor 13 with the frame number and the voice frame including the vocal/mute information (=mute) (SQ79). The mute section information processor 13 outputs the mute start voice frame (SQ80). This causes the mute compression control processor 15 to start the mute timer 15A (SQ81).

These processings correspond to steps SP51–SP55 and SP71–SP74 in the flowchart of FIG. 12. Specifically, when the frame number request is sent from the voice cell payload processor 12 while the mute timer 15A is in the OFF mode (step SP51) and the mute compression control processor 15 is waiting for the frame number request (step SP52), the mute compression control processor 15 receives it (SP53), and increments the frame number (SP54). Then, the mute compression control processor 15 makes a decision whether the vocal/mute information sent from the voice cell payload processor 12 is vocal or mute (SP55). Since it is mute in this case, the processing proceeds to step SP71 and sends the frame number to the mute section information processor 13. Receiving the frame number acknowledgement from the mute section information processor 13 (SP72), the mute compression control processor 15 sends the frame number to the voice cell payload processor 12 (SP73), and starts the mute mode (SP74) by switching the mute timer 15A from the OFF state to the ON state.

(3) Receiving Processing at the Intermediate Stage in the Mute Mode

Figure 10:
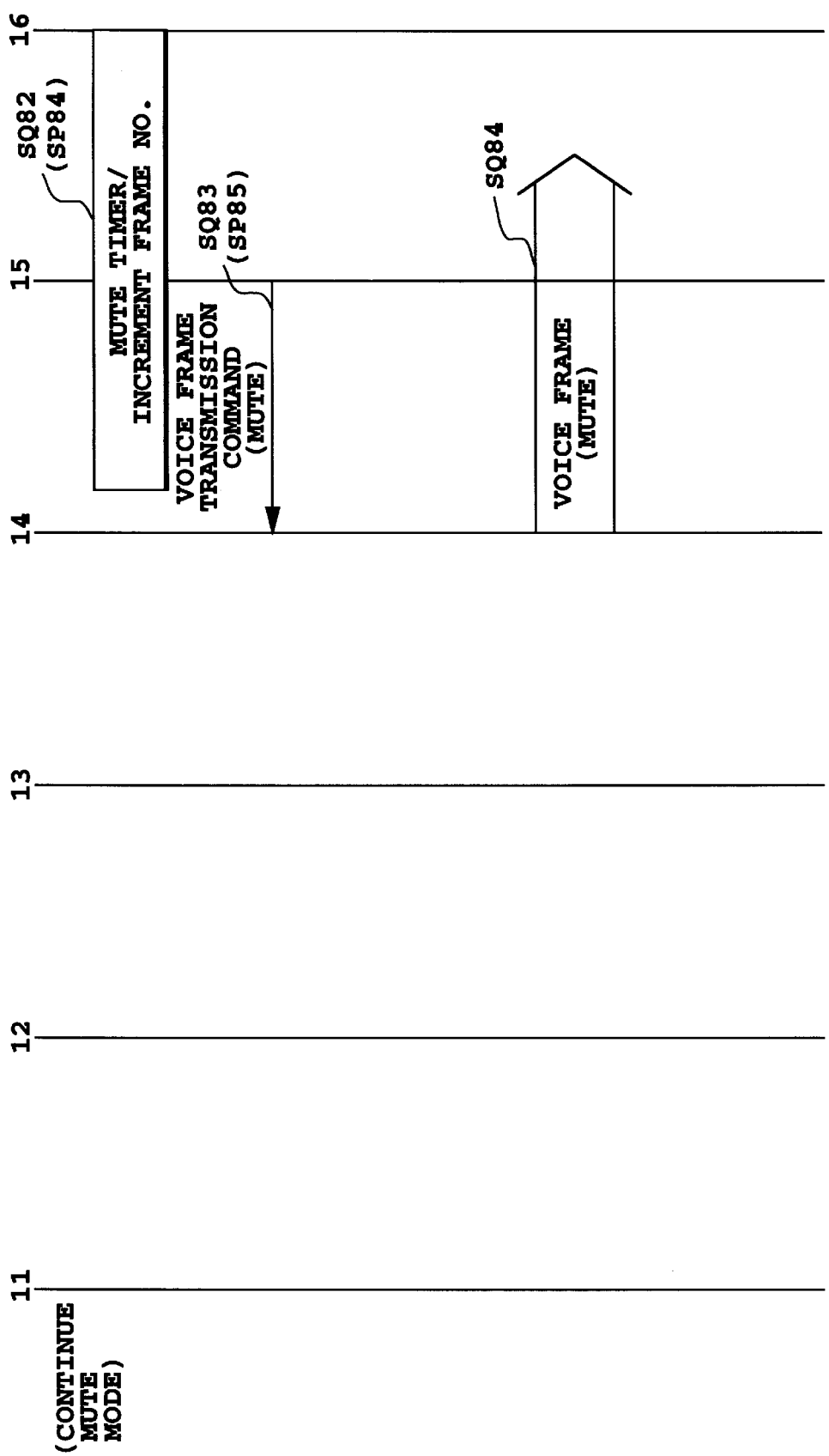
FIG. 10 is a sequence chart illustrating the intermediate stage of the mute processing in the receiver of the embodiment 1.

FIG. 10 is a sequence chart illustrating the receiving processing at the intermediate stage in the mute mode. Each time the mute timer 15A counts the fixed interval (frame interval), the mute compression control processor 15 increments the frame number (sequence SQ82), and provides the mute section autonomous generator 14 with the voice frame transmission command that instructs the generation of the mute voice frame (SQ83). Thus, the mute section autonomous generator 14 outputs the mute voice frame (SQ84).

These processings correspond to steps SP51 and SP81–SP85 in the flowchart of FIG. 12. Specifically, when the mute timer 15A counts the frame interval without receiving the frame number request while the mute timer 15A is in the ON mode (step SP51) and the mute compression control processor 15 is waiting for the frame number request (step SP81), the mute compression control processor 15 increments the frame number (SP84), and sends provides the mute section autonomous generator 14 with the voice frame transmission command (SP85). Thus, the mute section autonomous generator 14 generates the mute frame and outputs it.

Incidentally, considering the case where the mute end cell vanishes en route, it would be possible that the receiver receives the mute start cell again while recognizing that the present state is mute. In such a case, the decision at step SP83 becomes mute, and the intermediate stage of the mute processing is carried out in the foregoing steps SP84 and SP85.

(4) Receiving Processing at the Final Stage in the Mute Mode

FIG. 11 is a sequence chart illustrating the receiving processing at the final stage in the mute mode.

Receiving the voice cell sent from the transmitter, the header processor 11 provides the ATM cell control processor 16 with the ATM header information in the voice cell (SQ91). The ATM cell control processor 16 makes a decision whether the voice cell is addressed to the receiver using the ATM header information, and sends back the acknowledgement of the ATM header information to the header processor 11 (SQ92). When the voice cell is addressed to the receiver, the header processor 11 supplies the payload of the voice cell to the voice cell payload processor 12 (SQ93). The payload includes the vocal/mute information 24 which is vocal in this case.

Receiving the payload from the header processor 11, the voice cell payload processor 12 provides the mute compression control processor 15 with the frame number request including the vocal/mute information indicating that the payload is vocal (SQ94). Receiving the frame number request, the mute compression control processor 15 increments the frame number (SQ95), and delivers the frame number and the vocal/mute information indicating that the frame is vocal to the mute section information processor 13 (SQ96).

Receiving the frame number, the mute section information processor 13 sends back a frame number acknowledgement to the mute compression control processor 15 (SQ97). Then, the mute compression control processor 15 sends the frame number to the voice cell payload processor 12 (SQ98) which in turn provides the mute section information processor 13 with the frame number and the voice frame including the vocal/mute information (=vocal) (SQ99). The mute section information processor 13 outputs the mute end voice frame (SQ100). This causes the mute compression control processor 15 to stop the mute timer 15A (SQ101).

These processings correspond to steps SP51, SP81–SP83 and SP91–SP96 in the flowchart of FIG. 12. Specifically, receiving the frame number request sent from the voice cell payload processor 12 (SP82) while the mute timer 15A is in the ON mode (step SP51) and the mute compression control processor 15 is waiting for the frame number request (step SP81), the mute compression control processor 15 makes a decision whether the vocal/mute information indicates vocal or mute (SP83). Since it is vocal in this case, the processing proceeds to step SP91 and turns off the mute timer 15A (SP91). Then, the mute compression control processor 15 increments the frame number (SP92), and sends the frame number to the mute section information processor 13. Receiving the frame number acknowledgement from the mute section information processor 13 (SP94), the mute compression control processor 15 sends the frame number to the voice cell payload processor 12 (SP95), and starts the vocal mode (SP96) with maintaining the mute timer 15A in the OFF state. Thus, the mute mode ends.

Incidentally, in the case where mute start cells (or mute end cells) are received successively because of the extinction of a mute end cell (or mute start cell) due to channel failure or the like, the receiver can release the call considering that an abnormal state has occurred. Also, when no cell arrives for a predetermined time after receiving the mute start cell, the receiver can release the call considering that an abnormal state has occurred.

Embodiment 2

Figure 13A:
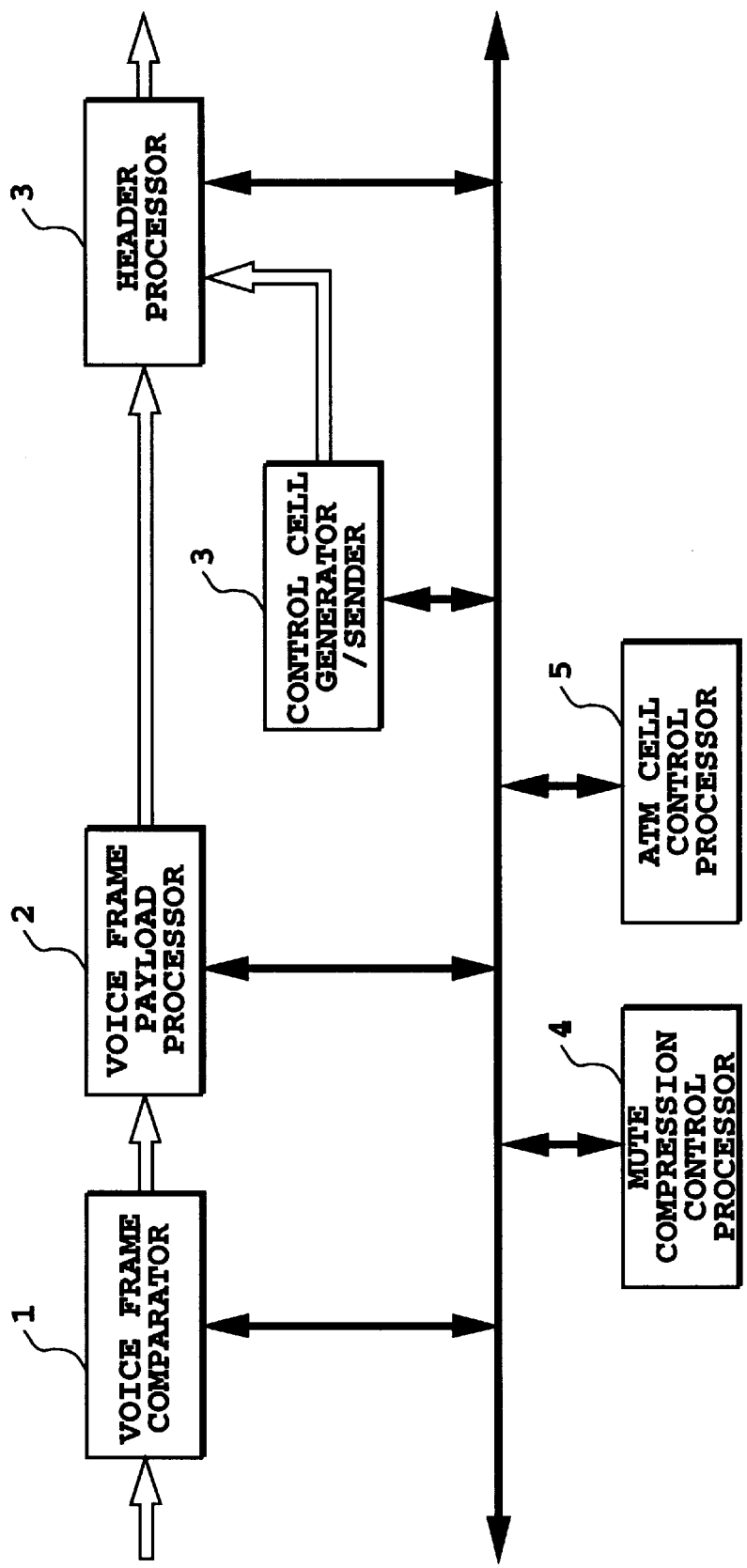
Figure 13B:
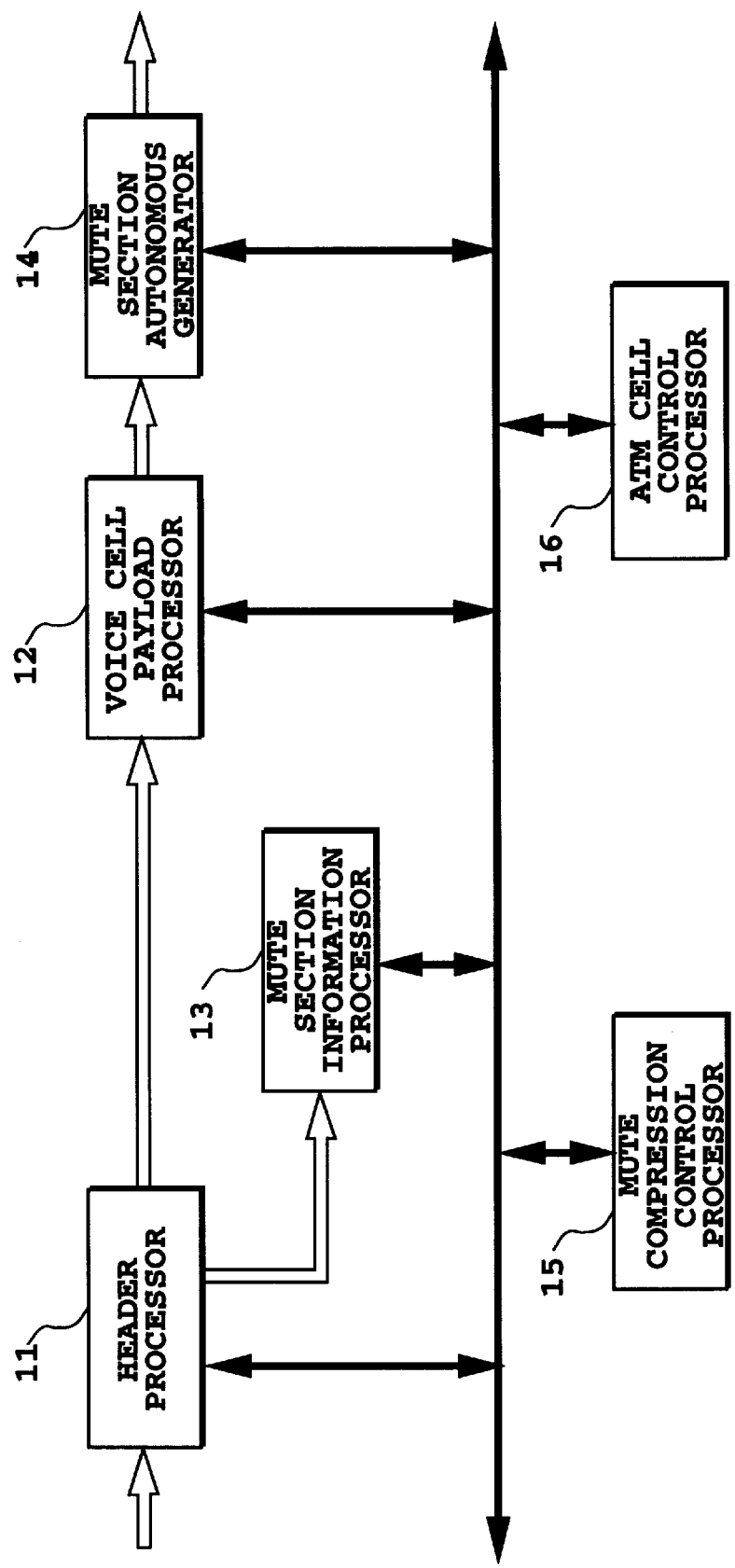

In the embodiment 1 described above, each frame is provided with the frame number to prevent the sequence of a plurality of frames from being confused between the voice frame comparator 1 and the voice cell payload processor 2, or between the voice cell payload processor 12 and the mute section information processor 13. This, however, complicates the control sequence. The present embodiment tries to simplify the control by sending, instead of using the frame number, a control cell to the receiving side through a control channel to notify the start and end of a mute section at its start and end instants. FIGS. 13A and 13B are block diagrams showing an embodiment 2 of an ATM transmission system with the mute compression control function in accordance with the present invention, wherein FIG. 13A shows a transmitter, and FIG. 13B shows a receiver.

The embodiment 2 differs from the embodiment 1 chiefly in the following:

(1) A control cell generator/sender 6 is provided between the header processor 3 and the bus of the transmitter.

The control cell generator/sender 6 generates the payload of a control cell (the mute start cell or mute end cell), and supplies it to the header processor 3. The control cells are transmitted to the receiver to notify the start and end in the mute mode through a control channel different from a channel sending the speech-spurt voice cells.

(2) Since the frame number is not used, the processings concerning the frame number are eliminated from the processings of the mute compression control processor 4 in the transmitter and those of the mute compression control processor 15 in the receiver. This will be described in more detail later.

(3) The mute section information processor 13 of the receiver is connected between the header processor 11 and the bus rather than between the voice cell payload processor 12 and mute section autonomous generator 14.

This is for identifying the mute start cell and mute end cell, and for notifying the mute compression control processor 15 of the reception of these cells.

Figure 14:
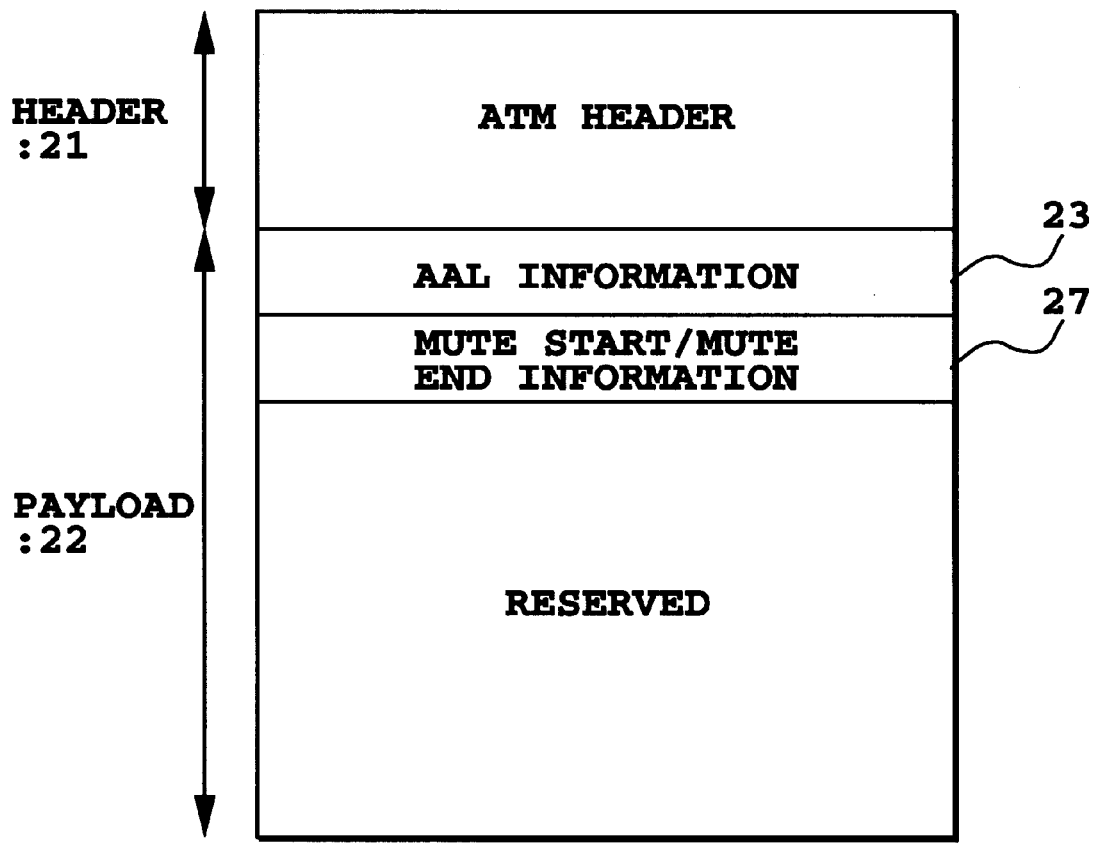
FIG. 14 is a schematic diagram illustrating the structure of a control cell used in the embodiment 2.

FIG. 14 is a schematic diagram illustrating an example of the control cell. The AAL information 23 and mute start/end information 27 are written at the head of the payload, which makes it possible to decides whether the control cell is a mute start cell or mute end cell.

Next, the transmitting operation of the present embodiment 2 will be described with reference to FIGS. 15–19.

(1) Transmission Processing of the Speech-Spurt Frame

Figure 15:
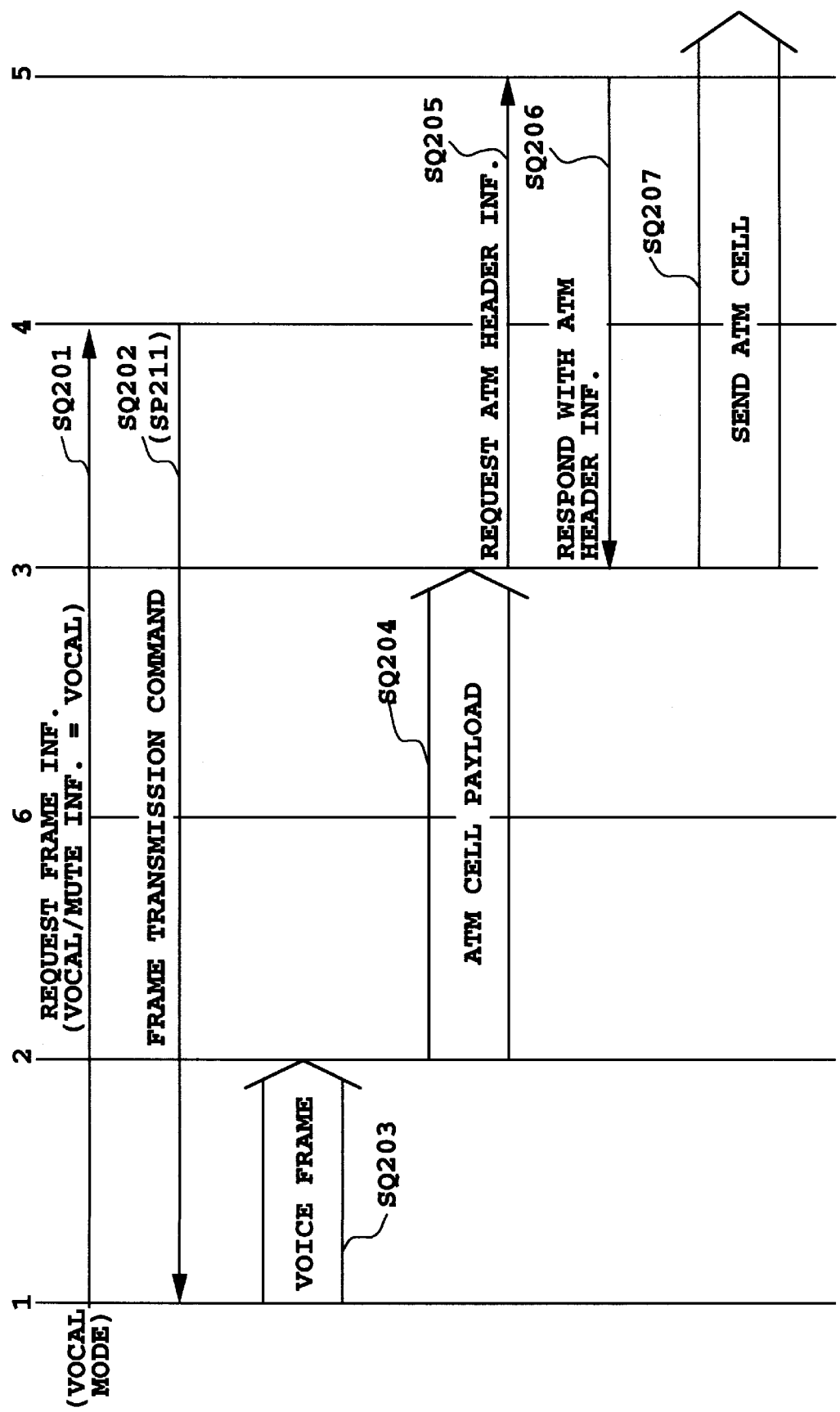
FIG. 15 is a sequence chart illustrating the processing of a speech spurt frame in the transmitter of the embodiment 2.

FIG. 15 is a sequence chart illustrating the transmission processing of the speech-spurt frame.

The voice frame comparator 1 makes a decision whether the input voice frame is a vocal or mute. In this case, since the voice frame is vocal, it sets the vocal/mute information=vocal, and sends a frame information request to the mute compression control processor 4 (sequence SQ201). Receiving the frame information request, the mute compression control processor 4 sends back a frame transmission command to the voice frame comparator 1 (SQ202) because the frame is a speech-spurt frame.

Receiving the command, the voice frame comparator 1 supplies the input voice frame to the voice cell payload processor 2 (SQ203) which in turn requests the header processor 3 to generate the ATM cell (voice cell). More specifically, the voice cell payload processor 2 adds the vocal/mute information 24 to the voice data generated from the multiple voice frames to generate the payload of the voice cell, and supplies the header processor 3 with the payload (SQ204). The header processor 3 requests the ATM cell control processor 5 to send the ATM header information (SQ205), and when receiving it (SQ206), it generates the ATM cell (voice cell) by adding the ATM header to the payload, and sends the ATM cell to the receiver (SQ207).

Figure 19:
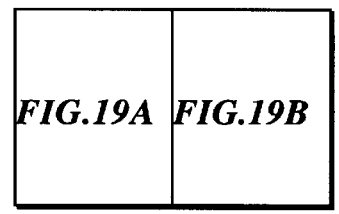
FIGS. 19, 19A, 19B show a flowchart illustrating the operation of the transmitter of the embodiment 2.
Figure 19A:
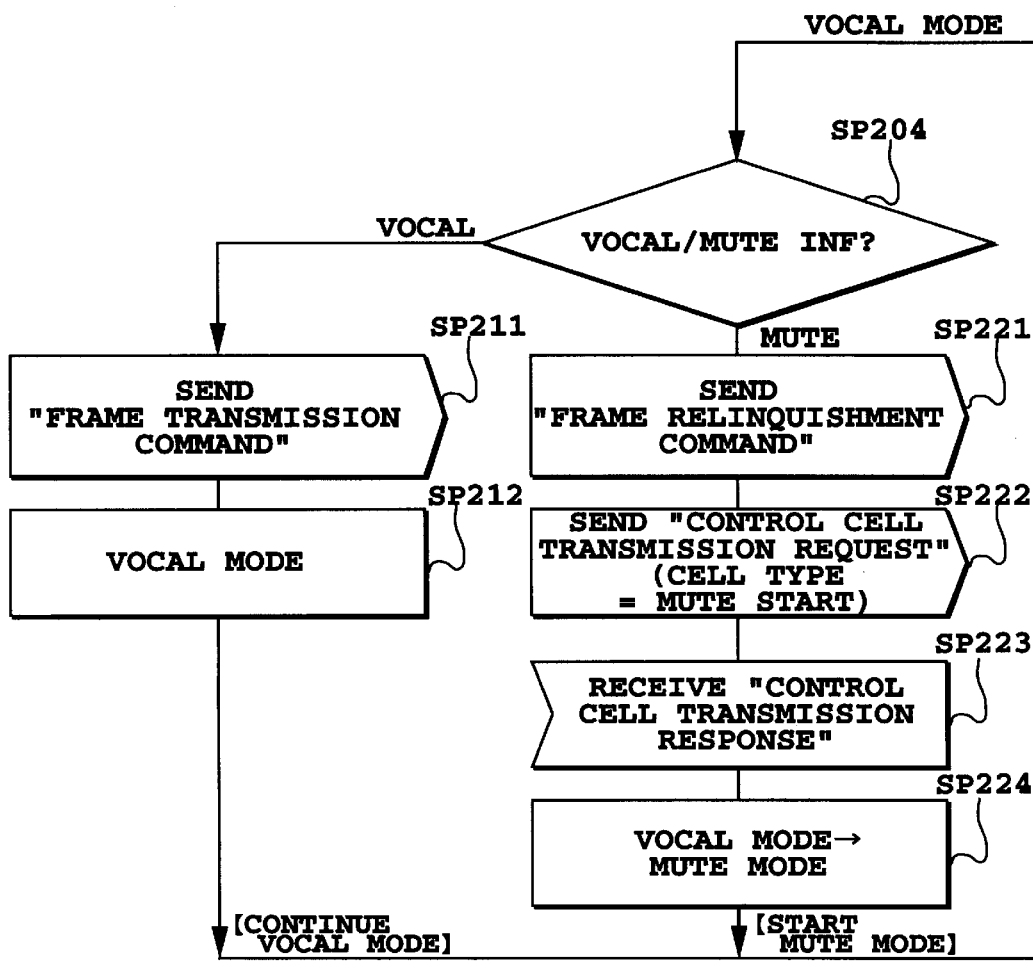
Figure 19B:
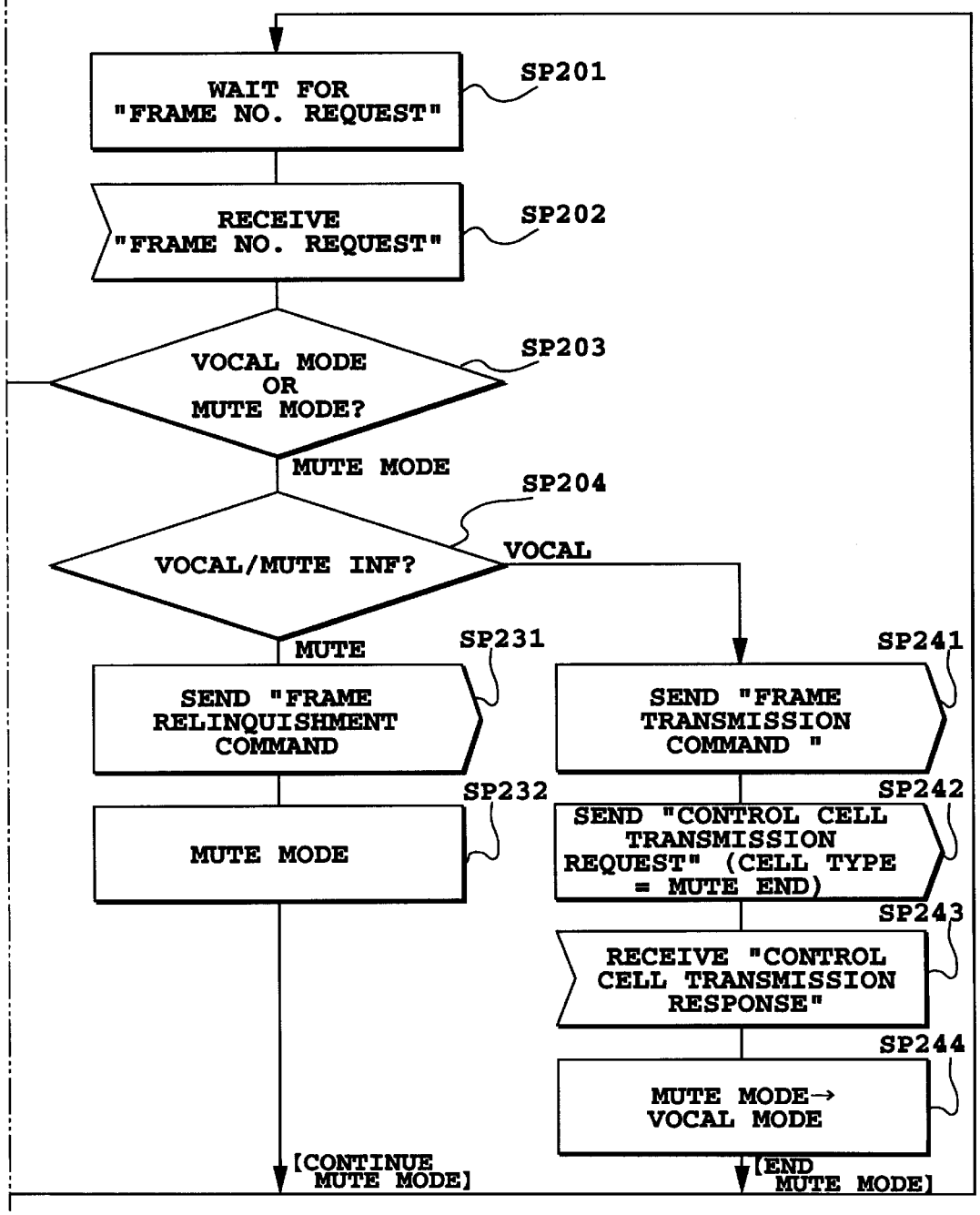

These processings correspond to steps SP201–SP204 and SP211–SP212 in the flowchart of FIG. 19. Specifically, when the frame information request is sent from the voice frame comparator 1 while waiting for the frame information request (step SP201), the mute compression control processor 4 receives it (SP202), and makes a decision whether the current operation mode is a vocal mode or mute mode (SP203). In the vocal mode, the mute compression control processor 4 further decides whether the vocal/mute information sent from the voice frame comparator 1 is vocal or mute (SP204). Since it is vocal in this case, the processing proceeds to step SP211 and sends the frame transmission command to the voice frame comparator 1 to continue the vocal mode (SP212).

(2) Transmission Processing at the Initial Stage in the Mute Mode

Figure 16:
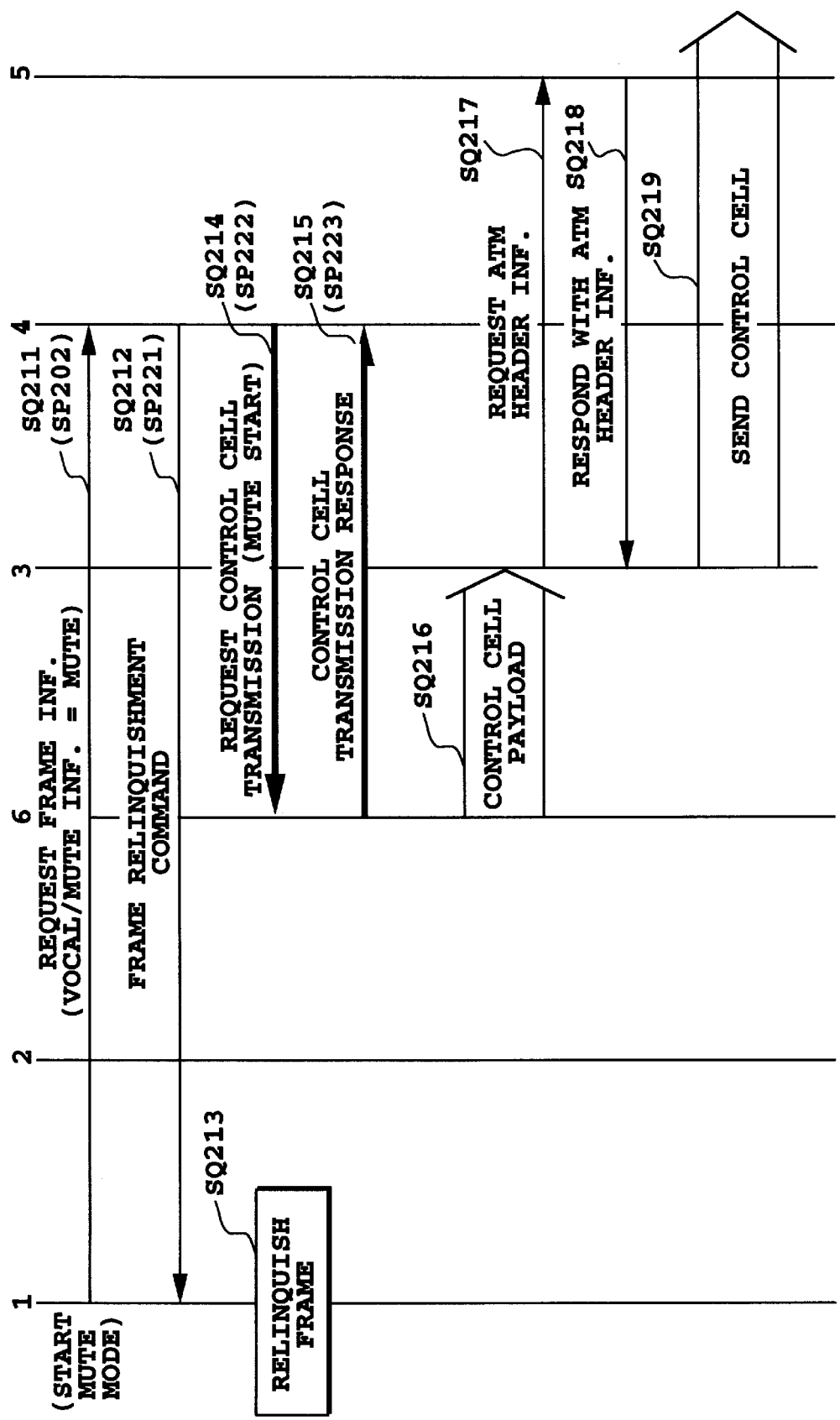
FIG. 16 is a sequence chart illustrating the initial stage of the mute processing in the transmitter of the embodiment 2.

FIG. 16 is a sequence chart illustrating the transmission processing at the initial stage in the mute mode.

The voice frame comparator 1 makes a decision whether the input voice frame is vocal or mute. Since it is mute in this case, it sets the vocal/mute information=mute, and requests the mute compression control processor 4 to send the frame information (sequence SQ211). Receiving the frame information request, the mute compression control processor 4 instructs the voice frame comparator 1 to relinquish the input voice frame (SQ212), and the voice frame comparator 1 relinquishes the input voice frame (SQ213).

On the other hand, the mute compression control processor 4 provides the control cell generator/sender 6 with a transmission request of the mute start cell (SQ214). Receiving the request, the control cell generator/sender 6 sends back its acknowledgement to the mute compression control processor 4 (SQ215), and then supplies the header processor 3 with the payload of the mute start cell (SQ216). The header processor 3 requests the ATM cell control processor 5 to send the ATM header information (SQ217), and when receiving it (SQ218), it generates the ATM cell (mute start cell) by adding the header to the payload, and sends the ATM cell to the receiver (SQ219).

These processings correspond to steps SP201–SP204 and SP221–SP224 in the flowchart of FIG. 19. Specifically, when the frame information request is sent from the voice frame comparator 1 while waiting for the frame information request (step SP201), the mute compression control processor 4 receives it (SP202), and makes a decision whether the current operation mode is the vocal mode or mute mode (SP203). In the vocal mode, it further decides whether the vocal/mute information sent from the voice frame comparator 1 is vocal or mute (SP204). Since it is mute in this case, the processing proceeds to step SP221 and sends a frame relinquishment command to the voice frame comparator 1. In addition, it sends the mute start cell transmission request to the control cell generator/sender 6 (SP222). Receiving the acknowledgement from the control cell generator/sender 6 (SP223), the mute compression control processor 4 switches the vocal mode to the mute mode (SP224), thereby starting the mute mode.

(3) Transmission Processing at the Intermediate Stage in the Mute Mode

Figure 17:
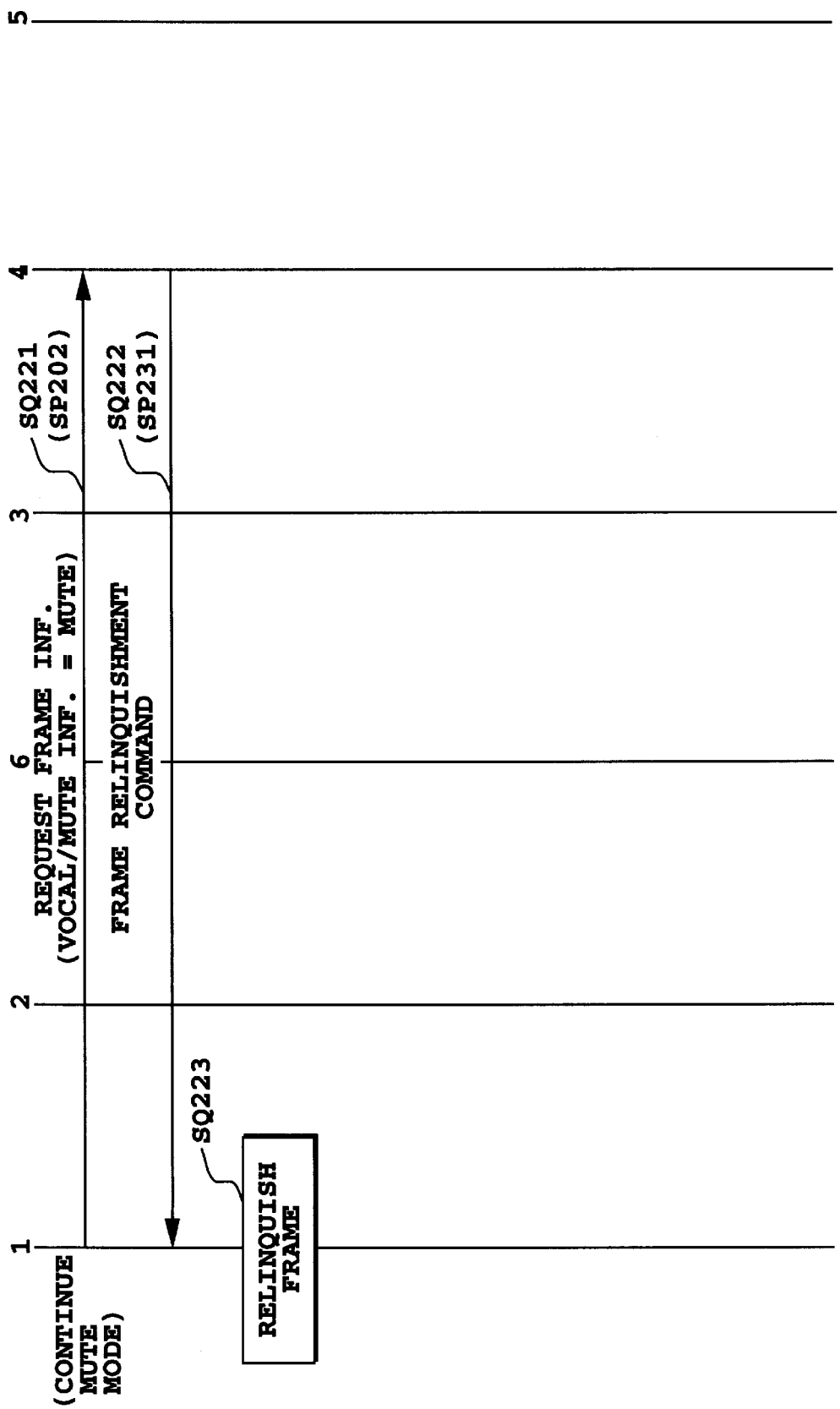
FIG. 17 is a sequence chart illustrating the intermediate stage of the mute processing in the transmitter of the embodiment 2.

FIG. 17 is a sequence chart illustrating the transmission processing at the intermediate stage in the mute mode.

The voice frame comparator 1 makes a decision whether the input voice frame is vocal or mute. Since it is mute in this case, it sets the vocal/mute information=mute, and requests the mute compression control processor 4 to send the frame information (sequence SQ221). Receiving the frame information request, the mute compression control processor 4 sends a frame relinquishment command to the voice frame comparator 1 (SQ222) which in turn relinquishes the input voice frame (SQ223) to suppress the generation of the voice cell. These sequences SQ221–SQ223 are iterated each time a mute voice frame is input until a speech-spurt voice frame is input.

These processings correspond to steps SP201–SP204, and SP231–SP232 in the flowchart of FIG. 19. Specifically, when the frame information request is sent from the voice frame comparator 1 while waiting for the frame information request (step SP201), the mute compression control processor 4 receives it (SP202). Then, the mute compression control processor 4 makes a decision whether the current operation mode is the vocal mode or mute mode (SP203), and decides in the mute mode whether the vocal/mute information sent from the voice frame comparator 1 is vocal or mute (SP204). Since it is mute in this case, the processing proceeds to step SP231 and sends the frame relinquishment command to the voice frame comparator 1 to continue the mute mode (SP232).

(4) Transmission Processing at the Final Stage in the Mute Mode

Figure 18:
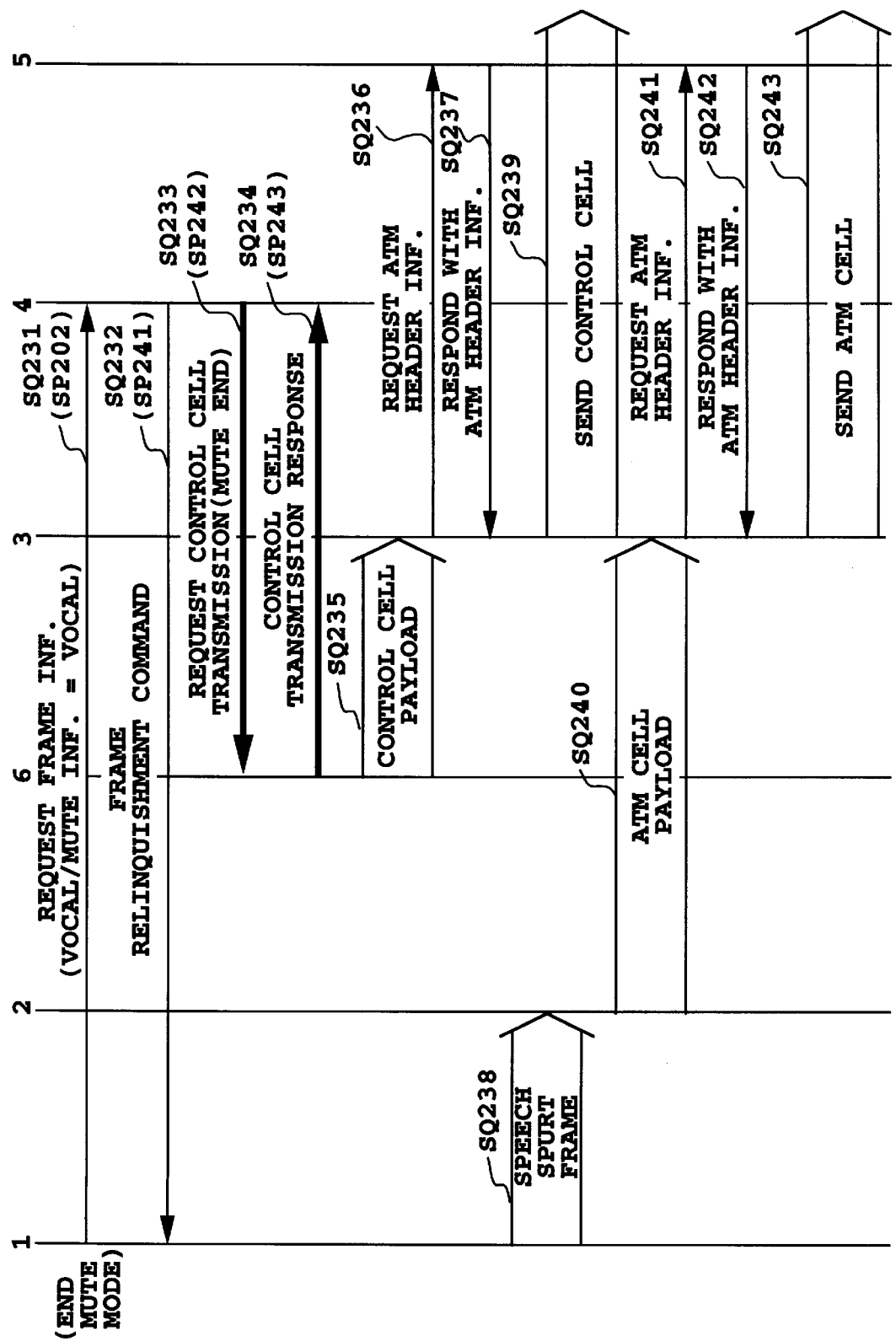
FIG. 18 is a sequence chart illustrating the final stage of the mute processing in the transmitter of the embodiment 2.

FIG. 18 is a sequence chart illustrating the transmission processing at the final stage in the mute mode.

The voice frame comparator 1 makes a decision whether the input voice frame is vocal or mute. Since it is vocal in this case, it sets the vocal/mute information=vocal, and requests the mute compression control processor 4 to send the frame information (sequence SQ231). Receiving the frame information request, the mute compression control processor 4 provides the voice frame comparator 1 with the frame transmission command (SQ232). Subsequently, the mute compression control processor 4 provides the control cell generator/sender 6 with a transmission request of the mute end cell. The control cell generator/sender 6, after sending back a response to the request to the mute compression control processor 4 (SQ234), generates the payload of the mute end cell, and supplies the header processor 3 with the payload (SQ234). The header processor 3 requests the ATM cell control processor 5 to send the ATM header information (SQ236), and when receiving it (SQ237), it generates the ATM cell (mute end cell) by adding the ATM header to the payload of the mute end cell, and sends the ATM cell to the receiver (SQ239).

In parallel with this, the voice frame comparator 1, receiving the frame transmission command, supplies the input voice frame to the voice cell payload processor 2 (SQ238). The voice cell payload processor 2 supplies the header processor 3 with the payload of the ATM cell including the input voice frame (SQ240). The header processor 3 requests the ATM cell control processor 5 to send the ATM header information (SQ241), and when receiving it (SQ242), it generates the ATM cell (speech-spurt voice cell) by adding the ATM header to the payload, and sends the ATM cell to the receiver (SQ243).

These processings correspond to steps SP201–SP204, and SP241–SP244 in the flowchart of FIG. 19. Specifically, when the frame information request is sent from the voice frame comparator 1 while waiting for the frame information request (step SP201), the mute compression control processor 4 receives it (SP202). Then, the mute compression control processor 4 makes a decision whether the current operation mode is the vocal mode or mute mode (SP203), and further decides in the mute mode whether the vocal/mute information sent from the voice frame comparator 1 is vocal or mute (SP204). Since it is vocal in this case, the processing proceeds to step SP241 to send the frame transmission command to the voice frame comparator 1, and to send the mute end cell transmission request to the control cell generator/sender 6 (SP242). Receiving the acknowledgement of receiving the command from the control cell generator/sender 6 (SP243), the mute compression control processor 4 switches the mute mode to the vocal mode (SP244), thereby terminating the mute mode and starting the vocal mode.

Figure 23:
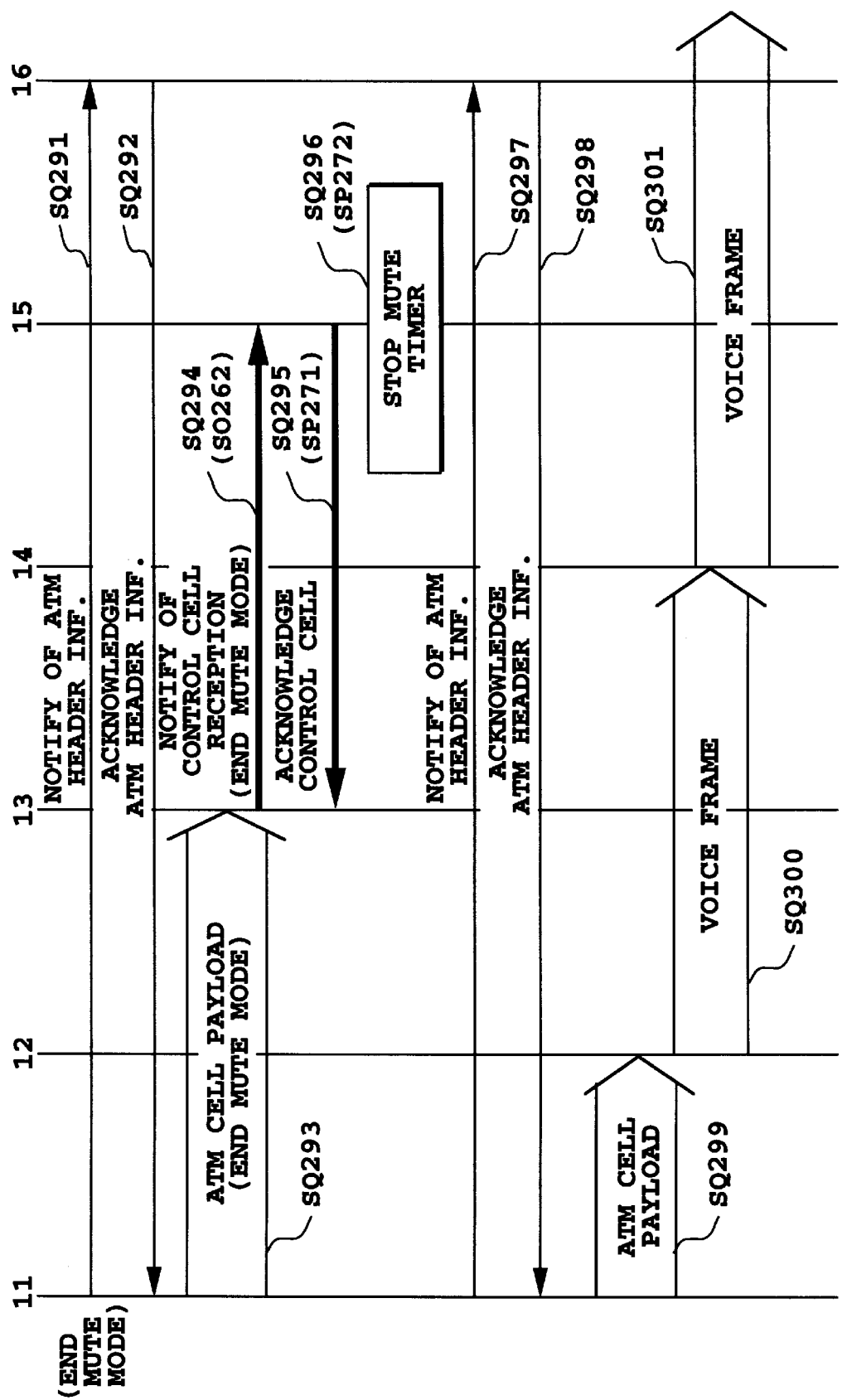
FIG. 23 is a sequence chart illustrating the final stage of the mute processing in the receiver of the embodiment 2.
Figure 24:
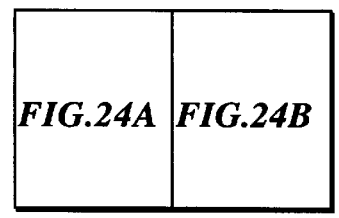
FIGS. 24, 24A, 24B show a flowchart illustrating the operation of the receiver of the embodiment 2.
Figure 24A:
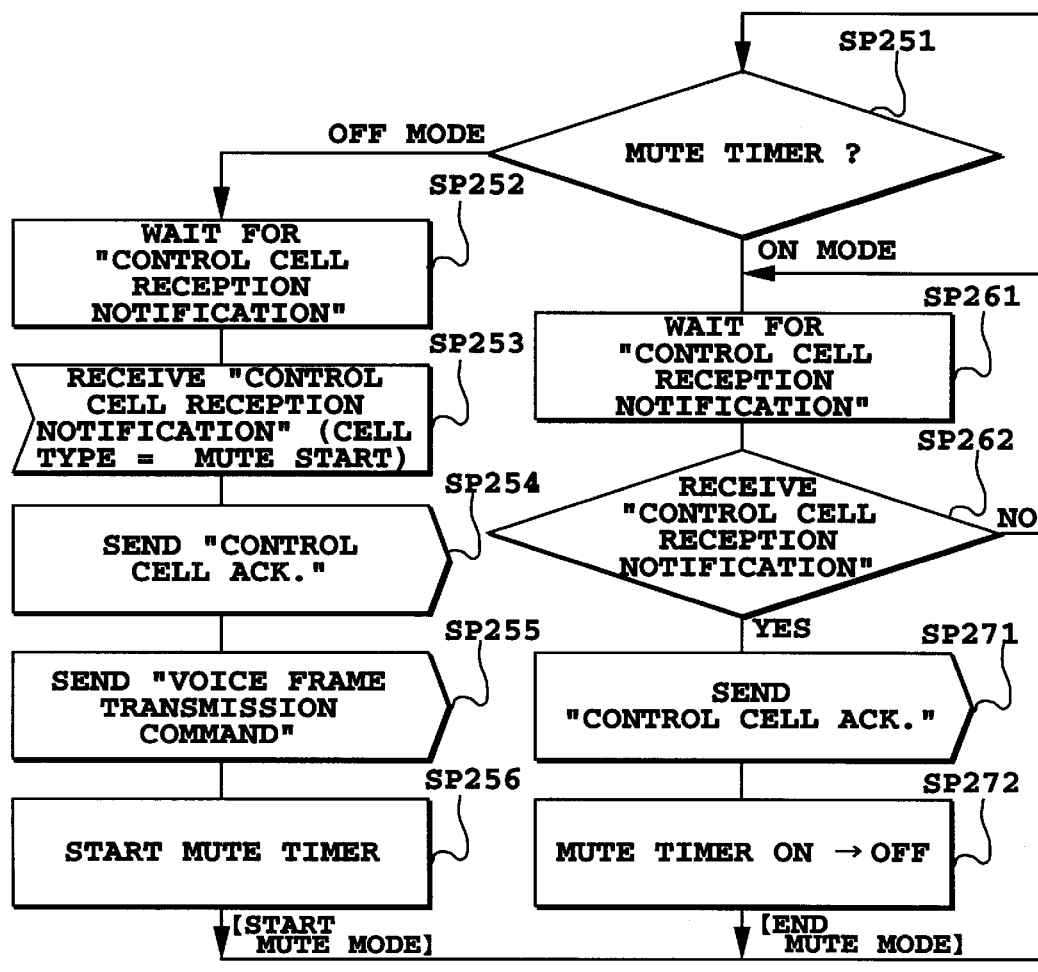
Figure 24B:
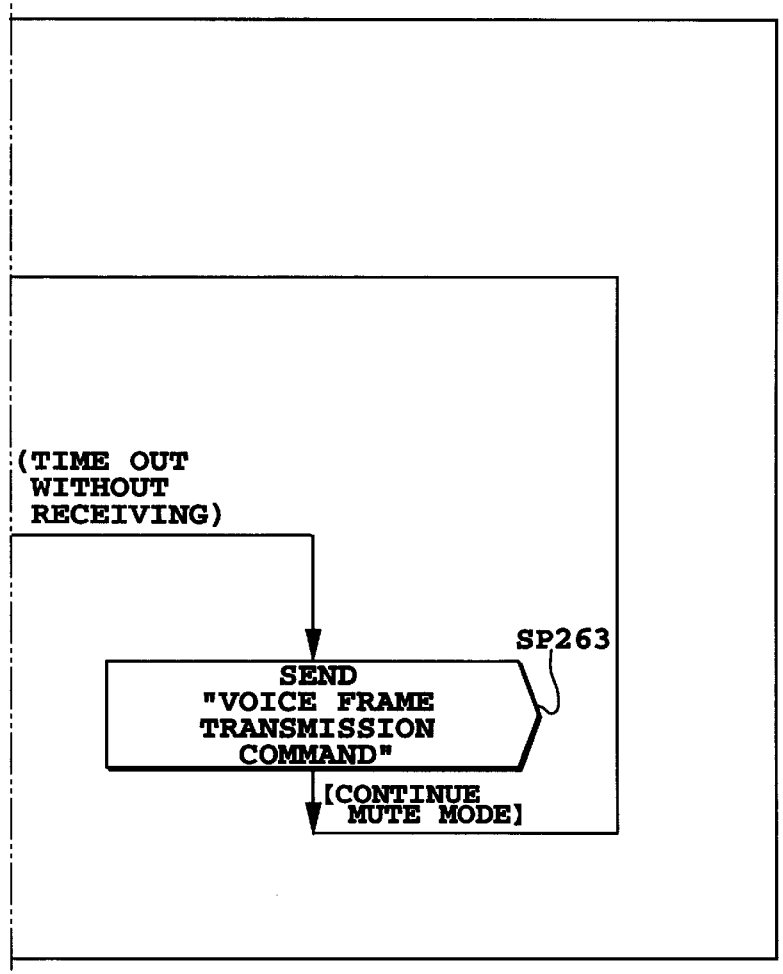

Next, the receiving processing of the embodiment will be described with reference to the sequence charts of FIGS. 20–23, and the flowchart of FIG. 24 illustrating the operation of the mute compression control processor 15.

(1) Receiving Processing of the Speech-Spurt Voice Cell

Figure 20:
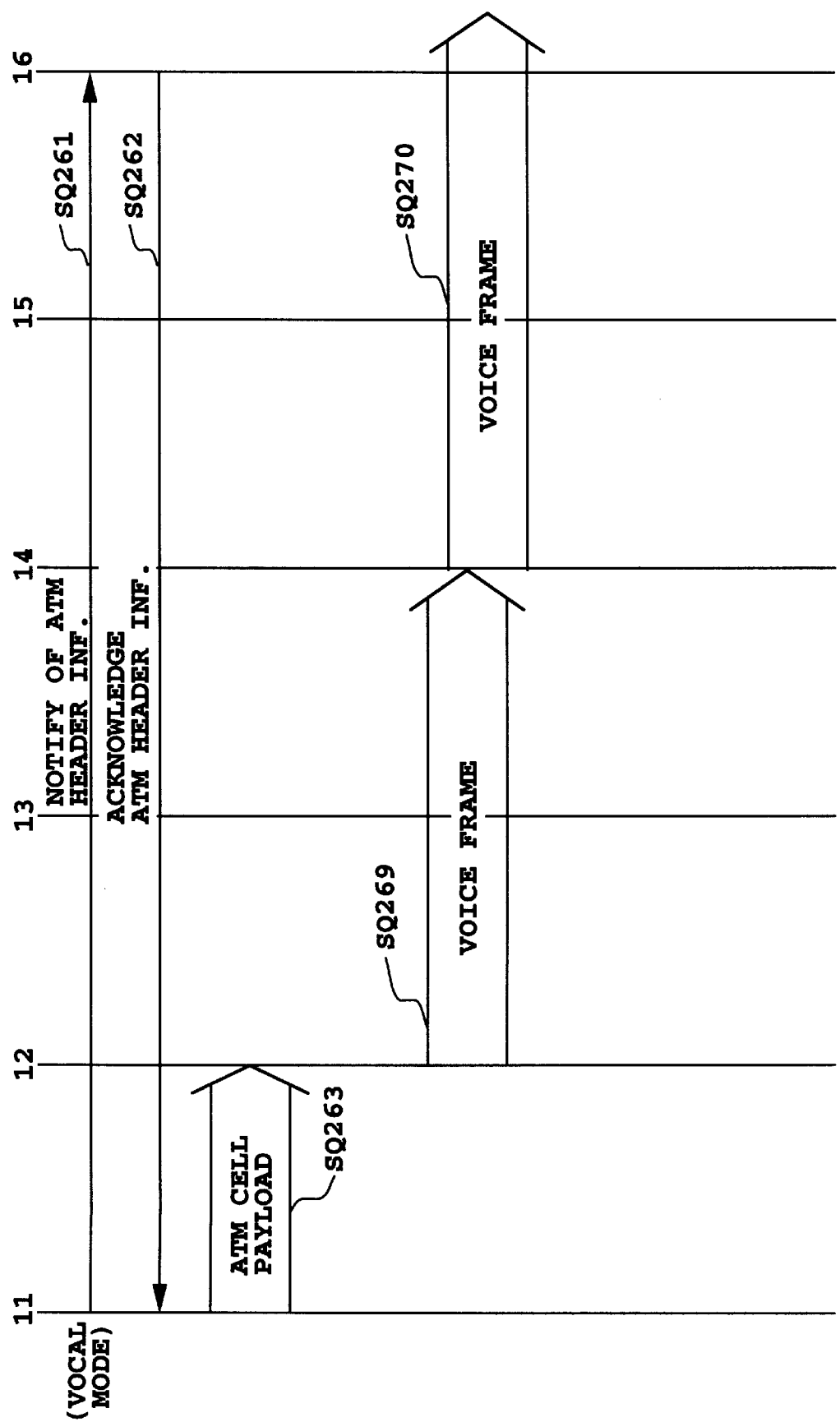
FIG. 20 is a sequence chart illustrating the processing of a speech spurt cell in the receiver of the embodiment 2.

FIG. 20 is a sequence chart illustrating the receiving processing of the speech-spurt voice cell.

Receiving the voice cell sent from the transmitter, the header processor 11 provides the ATM cell control processor 16 with the ATM header information in the voice cell (SQ261). The ATM cell control processor 16 makes a decision whether the voice cell is addressed to the receiver using the ATM header information, and sends back the acknowledgement of the ATM header information to the header processor 11 (SQ262). When the voice cell is addressed to the receiver, the header processor 11 supplies the payload of the voice cell to the voice cell payload processor 12 (SQ263). In this case, the payload includes the vocal/mute information 24 which is vocal.

Receiving the payload from the header processor 11, the voice cell payload processor 12 divides the payload to pieces of data, each piece having a frame length, and sends each piece of data to the mute section autonomous generator 14 as a voice frame (SQ269). The mute section autonomous generator 14 outputs the voice frame (SQ270). The processings in sequences SQ269–SQ270 are iterated until the data in the payload are exhausted, during which the voice frames are sequentially output.

(2) Receiving Processing at the Initial Stage in the Mute Mode

Figure 21:
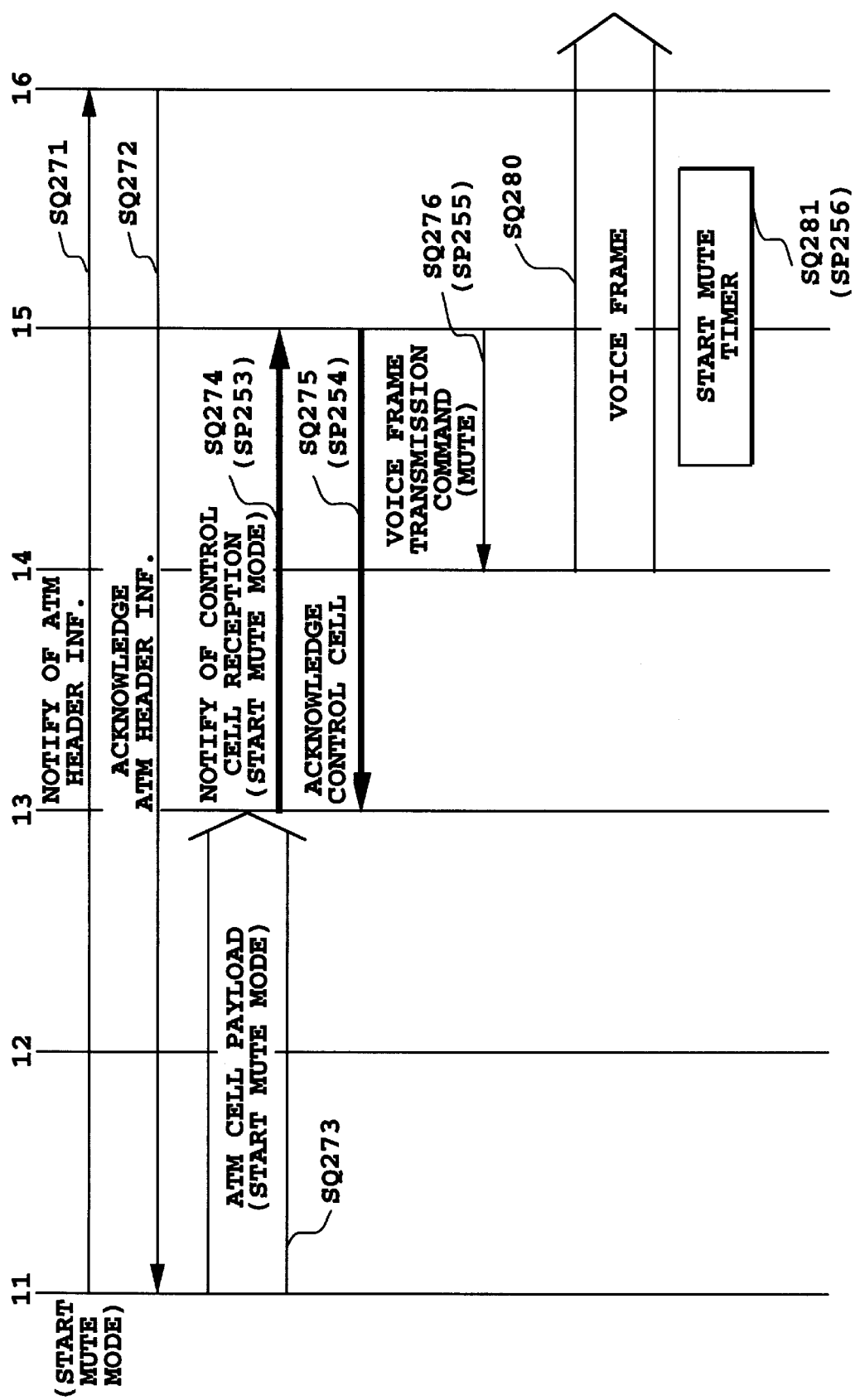
FIG. 21 is a sequence chart illustrating the initial stage of a mute processing in the receiver of the embodiment 2.

FIG. 21 is a sequence chart illustrating the receiving processing at the initial stage in the mute mode.

Receiving the control cell sent from the transmitter, the header processor 11 provides the ATM cell control processor 16 with the ATM header information in the control cell (SQ271). The ATM cell control processor 16 makes a decision whether the control cell is addressed to the receiver using the ATM header information, and sends back the acknowledgement of the ATM header information to the header processor 11 (SQ272). When the control cell is addressed to the receiver, the header processor 11 supplies the payload of the control cell to the mute section information processor 13 (SQ273). The payload includes the mute start/mute end information 27 which is mute start in this case.

Receiving the payload from the header processor 11, the mute section information processor 13 sends a control cell reception notification to the mute compression control processor 15 (SQ274). Receiving the control cell reception notification, the mute compression control processor 15 sends back a control cell reception acknowledgement to the mute section information processor 13 (SQ275). Subsequently, the mute compression control processor 15 sends a voice frame transmission command to the mute section autonomous generator 14 (SQ276) which in turn outputs the mute start voice frame (SQ280). This causes the mute compression control processor 15 to start the mute timer 15A (SQ281).

These processings correspond to steps SP251–SP256 in the flowchart of FIG. 24. Specifically, when the control cell reception notification is sent from the mute section information processor 13 while the mute timer 15A is in an OFF mode (step SP251) and the mute compression control processor 15 is waiting for the control cell reception notification (step SP252), the mute compression control processor 15 receives it (SP253). Then, after sending the control cell reception acknowledgement to the mute section information processor 13 (SP254), the mute compression control processor 15 sends the voice frame transmission command to the mute section autonomous generator 14 (SP255). This causes the mute section autonomous generator 14 to send out the voice frame (SQ280). Finally, the mute compression control processor 15 starts the mute mode by switching the mute timer 15A from the OFF state to the ON state (SP256).

(3) Receiving Processing at the Intermediate Stage in the Mute Mode

Figure 22:
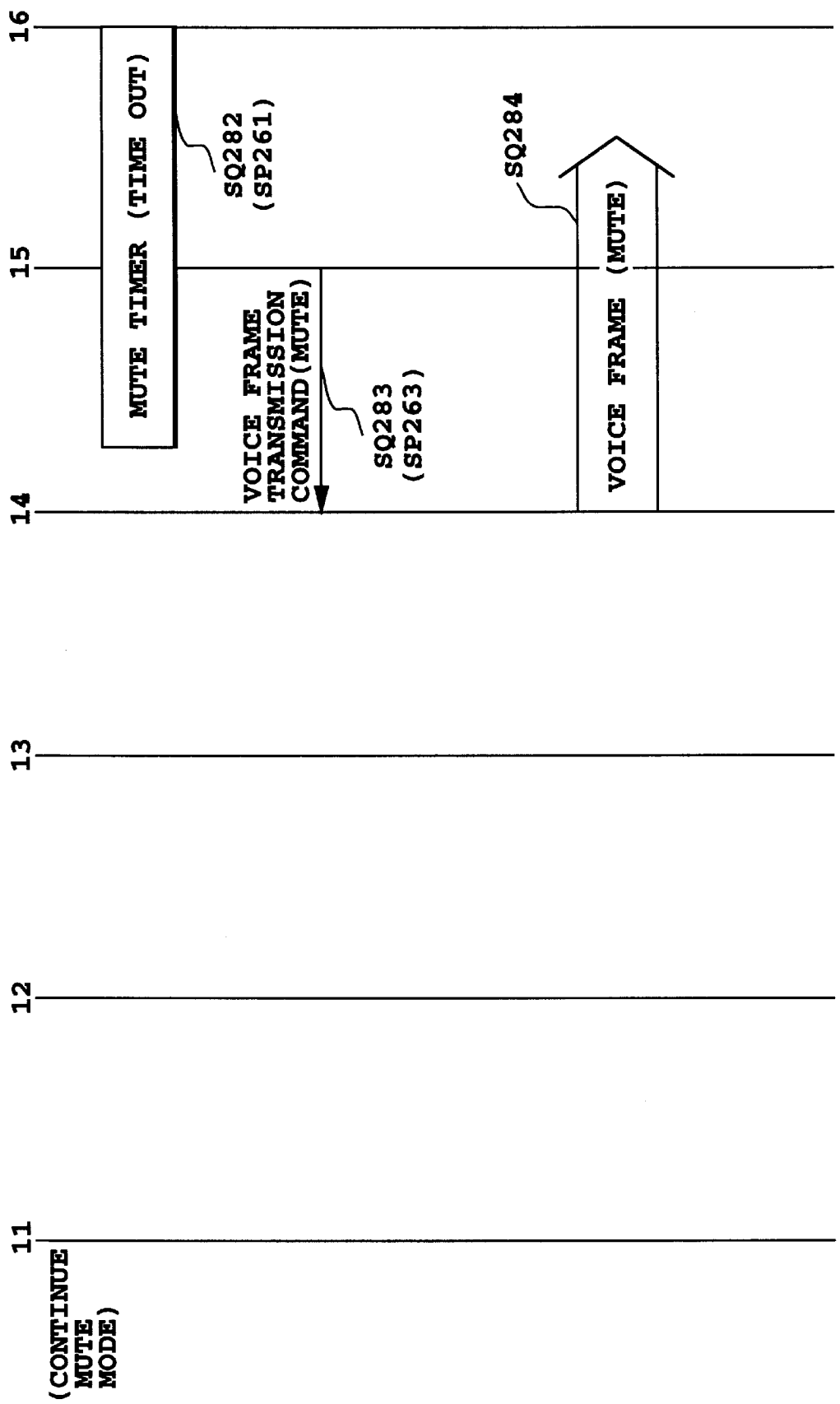
FIG. 22 is a sequence chart illustrating the intermediate stage of the mute processing in the receiver of the embodiment 2.

FIG. 22 is a sequence chart illustrating the receiving processing at the intermediate stage in the mute mode. Each time the mute timer 15A counts the fixed interval (frame interval) (sequence SQ282), the mute compression control processor 15 provides the mute section autonomous generator 14 with the voice frame transmission command that instructs the generation of the mute voice frame (SQ283). Thus, the mute section autonomous generator 14 outputs the mute voice frame (SQ284).

These processings correspond to steps SP251 and SP261–SP263 in the flowchart of FIG. 24. Specifically, when the mute timer 15A counts up the frame interval without receiving the control cell reception notification (SP262) while the mute timer 15A is in the ON mode (step SP251) and the mute compression control processor 15 is waiting for the control cell reception notification (step SP261), the mute compression control processor 15 provides the mute section autonomous generator 14 with the voice frame transmission command (SP263). Thus, the mute section autonomous generator 14 generates the mute frame and outputs it.

(4) Receiving Processing at the Final Stage in the Mute Mode

FIG. 23 is a sequence chart illustrating the receiving processing at the final stage in the mute mode.

Receiving the control cell sent from the transmitter, the header processor 11 provides the ATM cell control processor 16 with the ATM header information in the control cell (SQ291). The ATM cell control processor 16 makes a decision whether the control cell is addressed to the receiver using the ATM header information, and sends back the acknowledgement of the ATM header information to the header processor 11 (SQ292). When the control cell is addressed to the receiver, the header processor 11 supplies the payload of the control cell to the mute section information processor 13 (SQ293). The payload includes the mute start/mute end information 27 which is mute end in this case.

Receiving the payload from the header processor 11, the mute section information processor 13 provides the mute compression control processor 15 with the control cell reception notification (SQ294). Receiving the control cell reception notification, the mute compression control processor 15 sends back a control cell reception acknowledgement to the mute section information processor 13 (SQ295), and stops the mute timer 15A.

Next, the header processor 11 receives the speech-spurt voice cell sent from the transmitter, and provides the ATM cell control processor 16 with the ATM header information of the speech-spurt voice cell (SQ297). The ATM cell control processor 16 makes a decision whether or not the voice cell is addressed to the receiver in accordance with the ATM header information, and sends back the ATM header information acknowledgement to the header processor 11 (SQ298). When the voice cell is addressed to the receiver, the header processor 11 supplies the voice cell payload processor 12 with the payload of the voice cell (SQ299). The payload includes the vocal/mute information 24 which is vocal in this case. The voice cell payload processor 12 divides the payload into pieces of data, each piece having the frame length, to generate the voice frames, and supplies them to the mute section autonomous generator 14 (SQ300). The mute section autonomous generator 14 outputs the speech-spurt voice frames (SQ301).

These processings correspond to steps SP251, SP261–SP262 and SP271–SP272 in the flowchart of FIG. 24. Specifically, receiving the control cell reception notification sent from the mute section information processor 13 (SP262) while the mute timer 15A is in the ON mode (step SP251) and the mute compression control processor 15 is waiting for the control cell reception notification (step SP261), the mute compression control processor 15 sends the control cell reception acknowledgement to the mute section information processor 13 (SP271). Then, the mute compression control processor 15 turns off the mute timer 15A to complete the mute mode.

The following variations can be made with the foregoing embodiments.

(1) The foregoing embodiments generate the mute start cell and mute end cell at the transition from vocal to mute, and mute to vocal. Instead of this, it is possible to generating only the mute start cell at the transition from vocal to mute without providing the speech-spurt voice cell with a particular identification.

More specifically, the transmitter generates the mute start cell at the transition only from vocal to mute, and the voice cell having no vocal/mute information in the other cases. On the other hand, the receiver carries out the following receiving processing. First, when receiving the voice cells other than the mute start cell in the vocal mode, the receiver makes a decision that it is the speechspurt voice cell, and generates the voice frame from the received voice cell. Second, when detecting the mute start cell in the vocal mode, the receiver switches the mode into the mute mode, and starts the autonomous generation of the mute frame. Thus, the mute frames are generated at the fixed frame interval.

On the other hand, when the cells other than the mute start cell is received in the mute mode, the receiver makes a decision that the speech-spurt voice cell is received so that it generates the voice frames from the received voice cell, and switches the mode into the vocal mode, thus completing the autonomous generation of the voice frame. When the mute start cell is received in the mute mode, the receiver maintains the mute mode, which corresponds to the case in which another mute start cell is received during the mute state.

(2) Although it is assumed in the foregoing embodiments that the payload of the voice cell is longer than the frame, and hence a single payload includes a plurality of frames, this is not essential. For example, when the voice data 25 of the payload as shown in FIG. 2 has the same length as the frame, the foregoing embodiments can be applied without change. Furthermore, even when the frame is longer than the payload, the present invention can be easily applied by dividing the frame into pieces of data with a length of the payload.

(3) The voice frame comparator 1 in the foregoing embodiments can use voice levels or pattern matching in making a vocal/mute decision.

The vocal/mute decision using the voice levels is carried out by setting a threshold in advance, and by making a mute decision if the voice levels of the input voice frame are below the threshold level. Thus, the voice frame comparator 1 makes the mute decision when the voice levels are below the threshold through out the voice frame.

Figure 25:
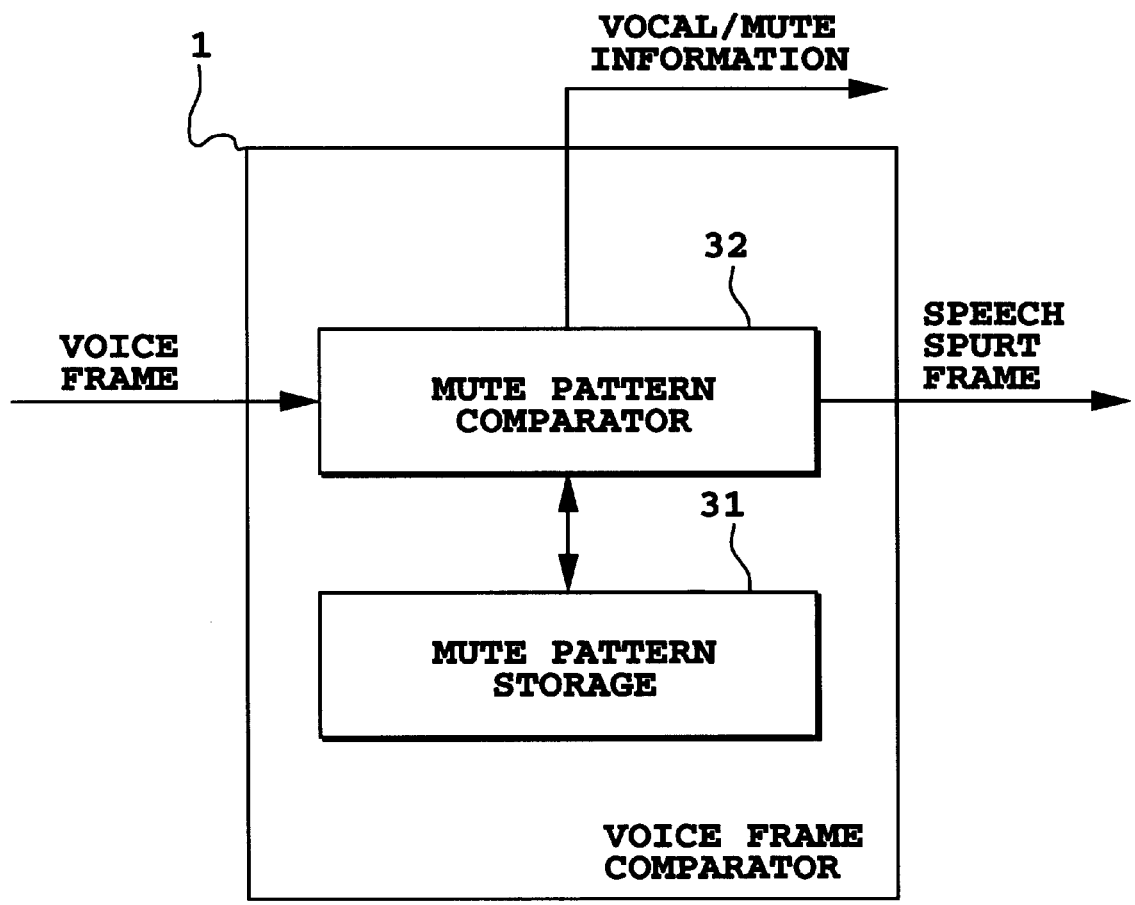
FIG. 25 is a block diagram illustrating an example of a voice frame comparator 1 in the embodiments 1 and 2.

On the other hand, the voice frame comparator 1 using the pattern matching has a configuration as shown in FIG. 25. In FIG. 25, a mute pattern storage 31 stores the mute patterns as reference patterns. A mute pattern comparator 32 compares the data in the input voice frame with the reference patterns, and makes a mute decision when they coincide. This method is effective when the bit patterns of the mute frame are limited in number.

(4) It may be possible to assign two bits to the vocal/mute information 24 as shown in FIG. 2 in such a manner that "00" denotes vocal, "01" denotes mute start, and "10" denotes mute end.

What is claimed is:

1. An ATM (Asynchronous Transfer Mode) transmission method for transmitting input voice data using a cell consisting of a fixed length bit sequence, said ATM transmission method comprising the steps of:
at a transmitting side,
detecting a mute section of said input voice data;
generating a mute start cell for notifying a pair of a start of said mute section, and transmitting said mute start cell;
suppressing said mute section as long as said mute section continues; and
generating, when said mute section ends, a mute end cell for notifying said pair of an end of said mute section, and transmitting said mute end cell, and
at a receiving side,
starting generation of said mute section when said mute start cell is received; and
stopping generation of said mute section when said mute end cell is received.

2. The ATM transmission method as claimed in claim 1, wherein said mute start cell and said mute end cell are transmitted through a control channel other than a channel for transmitting said voice data.

3. The ATM transmission method as claimed in claim 1, wherein said transmitting side handles said input voice data on a frame-by-frame basis, and detects said mute section frame by frame.

4. The ATM transmission method as claimed in claim 3, wherein said receiving side handles said voice data obtained from said cell on said frame-by-frame basis.

5. The ATM transmission method as claimed in claim 4, wherein said receiving side generates, after starting generation of said mute section, a mute frame every time a time period has elapsed corresponding to a length of said frame, and outputs said mute frame as said mute section.

6. The ATM transmission method as claimed in claim 3, wherein said transmitting side adds to said frame a number indicating an input sequence, and manages said frame in accordance with said number.

7. The ATM transmission method as claimed in claim 4, wherein said receiving side adds to said frame a number indicating a generated sequence, and manages said frame in accordance with said number.

8. The ATM transmission method as claimed in claim 1, wherein said receiving side releases a channel if said mute end cell does not arrive for a predetermined time period after receiving said mute start cell.

9. An ATM (Asynchronous Transfer Mode) transmission system for transmitting input voice data using a cell consisting of a fixed length bit sequence, said ATM transmission system comprising:
in a transmitter,
means for detecting a mute section of said input voice data;
means for generating and transmitting a mute start cell for notifying a pair of a start of said mute section;
means for suppressing said mute section as long as said mute section continues; and
means for generating and transmitting, when said mute section ends, a mute end cell for notifying said pair of an end of said mute section; and
in a receiver,
means for starting generation of said mute section when said mute start cell is received; and
means for stopping generation of said mute section when said mute end cell is received.

10. The ATM transmission system as claimed in claim 9, further comprising a control channel for transmitting said mute start cell and said mute end cell, said control channel being provided besides a channel for transmitting said voice data.

11. The ATM transmission system as claimed in claim 9, wherein said transmitter handles said input voice data on a frame-by-frame basis, and further comprises means for detecting whether said frame is vocal or mute.

12. The ATM transmission system as claimed in claim 11, wherein said receiver comprises means for converting said voice data obtained from the received cell into said frame.

13. The ATM transmission system as claimed in claim 12, wherein said receiver further comprises a mute timer for counting an elapsed time after starting generation of said mute section, and means for generating a mute frame every time said mute counter counts a time period corresponding to a length of said frame.

14. The ATM transmission system as claimed in claim 11, wherein said transmitter further comprises means for adding to said frame a number indicating an input sequence, and manages said frame in accordance with said number.

15. The ATM transmission system as claimed in claim 12, wherein said receiver further comprises means for adding to said frame a number indicating a generated sequence, and manages said frame in accordance with said number.

16. The ATM transmission system as claimed in claim 9, wherein said receiver further comprises means for counting an elapsed time after receiving said mute start cell, and means for releasing a channel if said mute end cell does not arrive for a predetermined time period.

17. A transmitter for an ATM (Asynchronous Transfer Mode) transmission system for transmitting input voice data using a cell consisting of a fixed length bit sequence, said transmitter comprising:
means for detecting a mute section of said input voice data;
means for generating and transmitting a mute start cell for notifying a pair of a start of said mute section;
means for suppressing said mute section as long as said mute section continues; and
means for generating and transmitting, when said mute section ends, a mute end cell for notifying said pair of an end of said mute section.

18. The transmitter as claimed in claim 17, further comprising means for feeding said mute start cell and said mute end cell to a control channel provided besides a channel for transmitting said voice data.

19. The transmitter as claimed in claim 17, wherein said transmitter handles said input voice data on a frame-by-frame basis, and further comprises means for detecting whether said frame is vocal or mute.

20. The transmitter as claimed in claim 19, further comprising means for adding to said frame a number indicating an input sequence, wherein said transmitter manages said frame in accordance with said number.

21. A receiver for an ATM (Asynchronous Transfer Mode) transmission system for transmitting input voice data using a cell consisting of a fixed length bit sequence, said ATM transmission system including, in a transmitter, means for detecting a mute section of said input voice data, means for generating and transmitting a mute start cell for notifying a pair of a start of said mute section, means for suppressing said mute section as long as said mute section continues, and means for generating and transmitting, when said mute section ends, a mute end cell for notifying said pair of an end of said mute section, said receiver comprising:

means for starting generation of said mute section when said mute start cell is received; and means for stopping generation of said mute section when said mute end cell is received.

22. The receiver as claimed in claim 21, further comprising means for receiving said mute start cell and said mute end cell, which are sent through a control channel provided besides a channel for transmitting said voice data.

23. The receiver as claimed in claim 21, further comprising means for converting said voice data obtained from the received cell into a frame with a fixed length.

24. The receiver as claimed in claim 21, further comprising a mute timer for counting an elapsed time after starting generation of said mute section, and means for generating a mute frame every time said mute counter counts a time period corresponding to a length of said frame.

25. The receiver as claimed in claim 24, further comprising means for adding to said frame a number indicating a generated sequence, wherein said receiver manages said frame in accordance with said number.

26. The receiver as claimed in claim 21, further comprising means for counting an elapsed time after receiving said mute start cell, and means for releasing a channel if said mute end cell does not arrive for a predetermined time period.

* * * * *